(12) United States Patent
Tatsukami et al.

(10) Patent No.: US 9,952,632 B2
(45) Date of Patent: Apr. 24, 2018

(54) ELECTRONIC DEVICE AND HINGE UNIT

(71) Applicant: FUJITSU LIMITED, Kawasaki-shi, Kanagawa (JP)

(72) Inventors: Ikki Tatsukami, Tama (JP); Takashi Abe, Kawasaki (JP); Shingo Awaji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 15/071,832

(22) Filed: Mar. 16, 2016

(65) Prior Publication Data
US 2016/0208530 A1 Jul. 21, 2016

Related U.S. Application Data

(63) Continuation of application No. PCT/JP2013/076438, filed on Sep. 27, 2013.

(51) Int. Cl.
*G06F 1/16* (2006.01)
*E05D 3/10* (2006.01)

(52) U.S. Cl.
CPC ............ *G06F 1/1681* (2013.01); *E05D 3/10* (2013.01); *G06F 1/162* (2013.01); *G06F 1/1616* (2013.01); *G06F 1/1637* (2013.01)

(58) Field of Classification Search
CPC ...... G06F 1/1616; G06F 1/162; G06F 1/1681; G06F 1/1683
See application file for complete search history.

(56) References Cited

U.S. PATENT DOCUMENTS

| 8,146,207 B2 | 4/2012 | Hung et al. | |
|---|---|---|---|
| 2004/0075971 A1* | 4/2004 | Tseng | G06F 1/162 361/679.06 |

(Continued)

FOREIGN PATENT DOCUMENTS

| JP | H11-101050 | 4/1999 |
|---|---|---|
| JP | 2004-197862 | 7/2004 |

(Continued)

OTHER PUBLICATIONS

JPOA—Office Action of Japanese Patent Application No. 2015-538764 dated Sep. 20, 2016, with partial English translation.

(Continued)

*Primary Examiner* — Nidhi Thaker
(74) *Attorney, Agent, or Firm* — Fujitsu Patent Center

(57) ABSTRACT

An electrical device includes a coupling member, a supporting member, a movable member, and a sloped face. The coupling member is provided at a first casing, and is formed with a rotation shaft provided with a protruding portion at an outer peripheral portion thereof. The supporting member is provided at a second casing, and is formed with a shaft hole into which the rotation shaft is inserted. The movable member is provided at the radial direction outside of the rotation shaft and has a restricted movable range about the circumferential direction. The sloped face is formed at a contact portion of the movable member with the protruding portion, and is sloped toward the side closest to the rotation shaft on progression from the rear side toward the front side in the rotation direction when the protruding portion makes contact with the movable member.

20 Claims, 27 Drawing Sheets

(56) References Cited

U.S. PATENT DOCUMENTS

| | | | |
|---|---|---|---|
| 2005/0066477 A1* | 3/2005 | Yang | G06F 1/162 16/374 |
| 2006/0021195 A1 | 2/2006 | Yamada et al. | |
| 2006/0198093 A1* | 9/2006 | Chuang | E05D 3/10 361/679.09 |
| 2006/0218750 A1* | 10/2006 | Tajima | G06F 1/162 16/367 |
| 2007/0130727 A1* | 6/2007 | Lu | G06F 1/162 16/342 |
| 2007/0138363 A1* | 6/2007 | Hung | G06F 1/162 248/291.1 |
| 2009/0293231 A1 | 12/2009 | Yabe et al. | |
| 2010/0043175 A1* | 2/2010 | Wang | G06F 1/162 16/343 |
| 2010/0125975 A1* | 5/2010 | Zhang | G06F 1/162 16/337 |
| 2010/0170063 A1* | 7/2010 | Hung | G06F 1/162 16/343 |
| 2011/0035905 A1 | 2/2011 | Hung et al. | |
| 2011/0047753 A1* | 3/2011 | Yeh | G06F 1/162 16/342 |
| 2016/0195903 A1* | 7/2016 | Tatsukami | G06F 1/1681 361/679.27 |

FOREIGN PATENT DOCUMENTS

| | | |
|---|---|---|
| JP | 2006-118178 A | 5/2006 |
| JP | 2006-283824 A | 10/2006 |
| JP | 3140969 U | 3/2008 |
| JP | 2009-293639 A | 12/2009 |

OTHER PUBLICATIONS

International Search Report and Written Opinion of the International Searching Authority (Form PCT/ISA/210 and 237), dated Dec. 3, 2013 in connection with PCT/JP2013/076438 (11 pages).

* cited by examiner

FIG.8
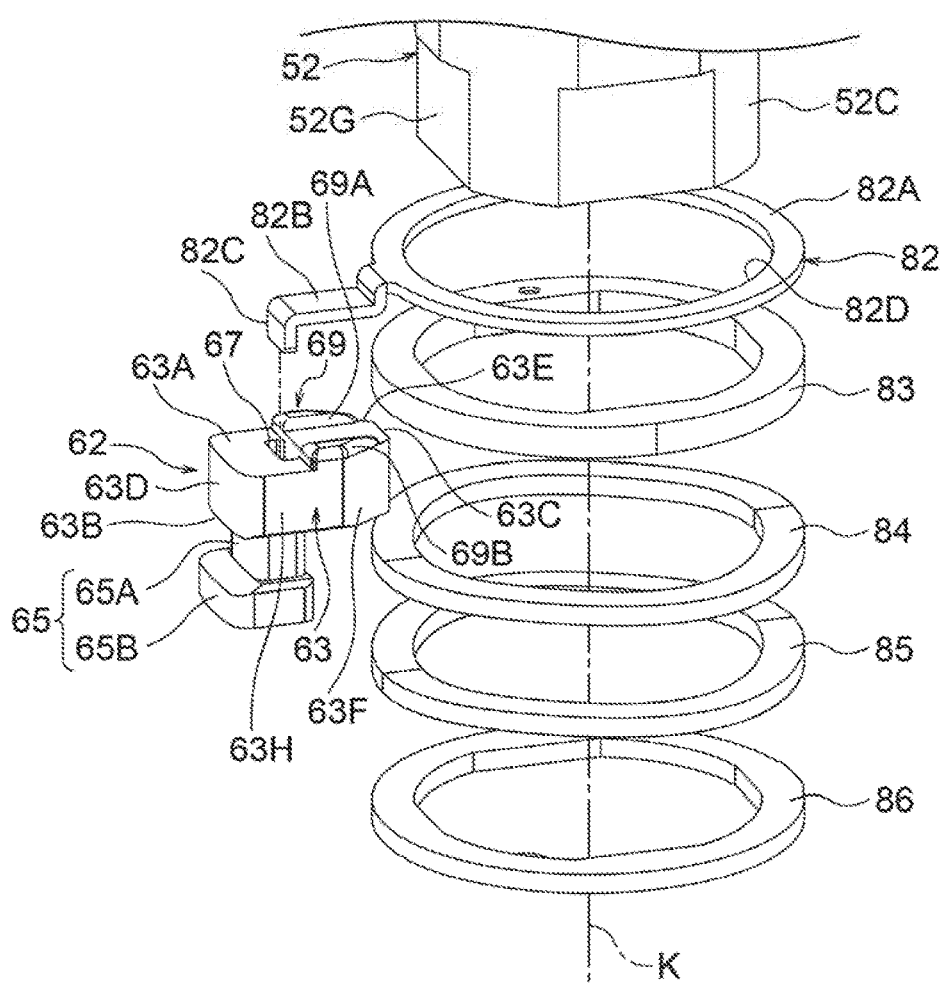
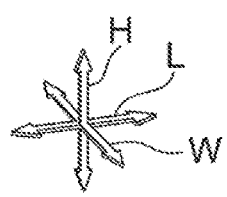

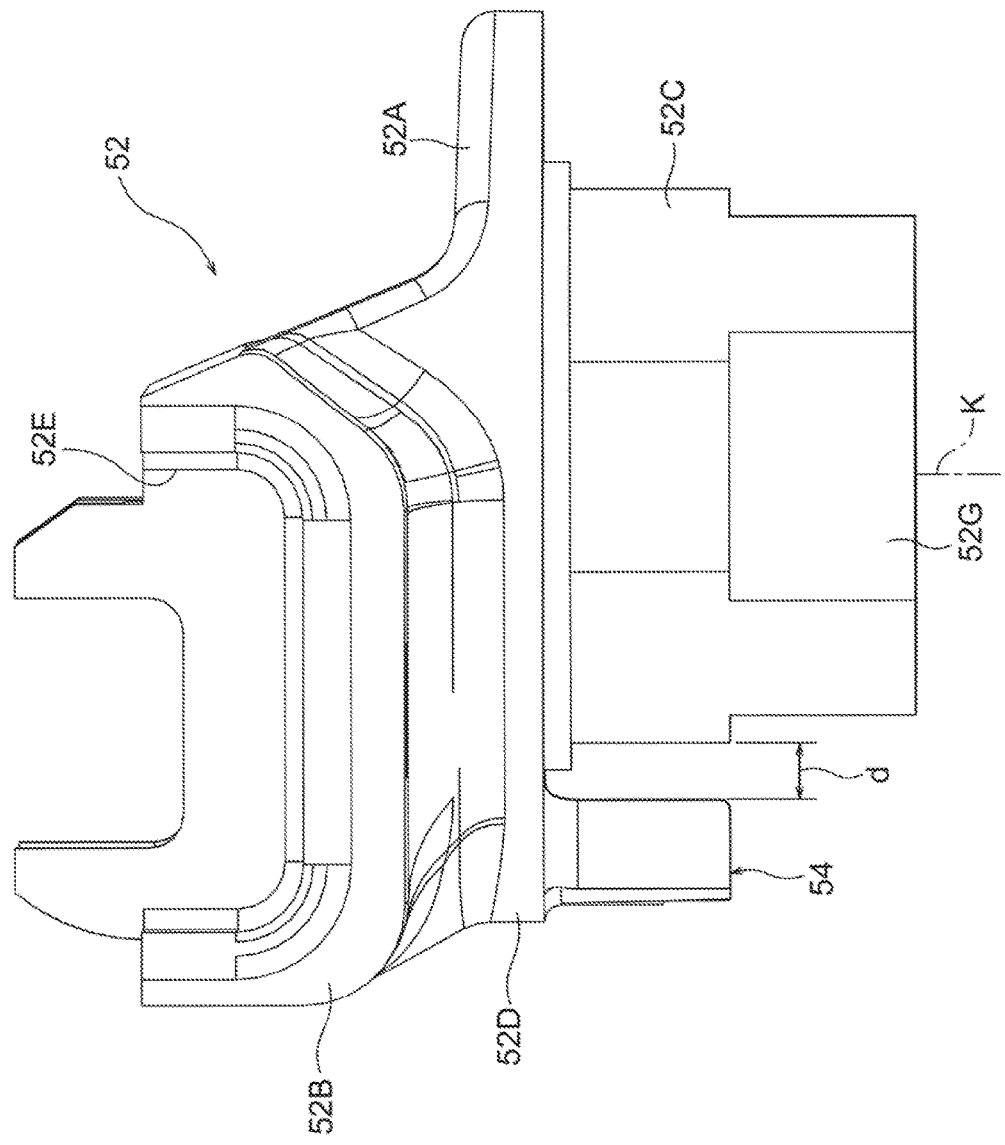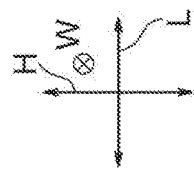

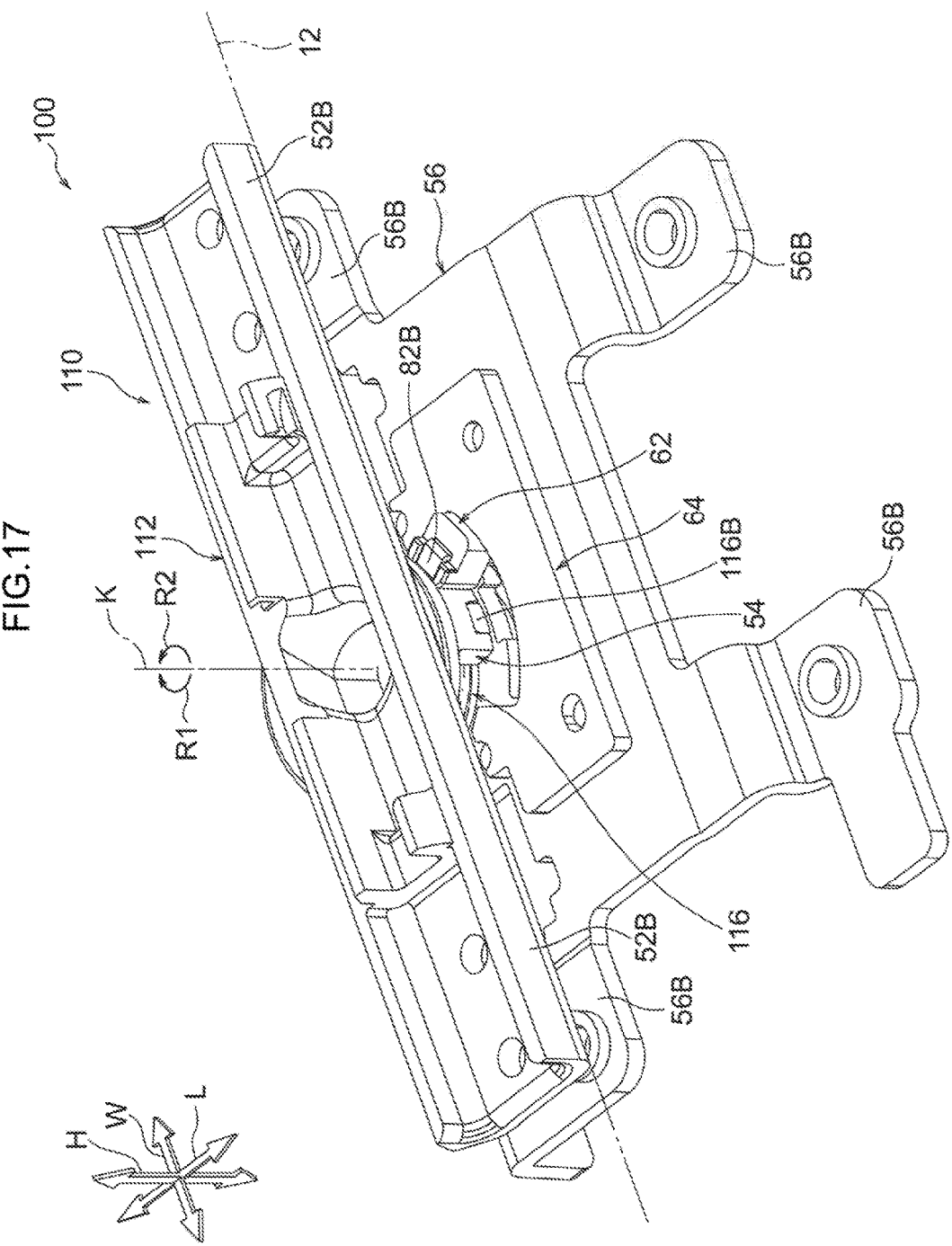

ELECTRONIC DEVICE AND HINGE UNIT

CROSS-REFERENCE TO RELATED APPLICATION

This application is a continuation application of International Application No. PCT/JP2013/076438 filed Sep. 27, 2013 and designated the U.S., the entire contents of which are incorporated herein by reference.

FIELD

The present disclosure relates to an electronic device and a hinge unit.

BACKGROUND

Conventional electronic devices are known in which a stopper portion provided at a rotation shaft of an upper casing, and a stopper portion provided at a lower casing, are made to contact each other, and force acting on the contact location is made to act in the plate thickness direction of the stopper portion of the upper casing. For example, refer to Japanese Patent Application Laid Open (JP-A) No. 2009-293639.

SUMMARY

In such electronic devices, force acting on a contact portion of the stopper portions is borne as it is by the rotation shaft. Thus, in such electronic devices, there is a concern that the rotation shaft is unable to support this force in cases in which the rotation shaft is made smaller in diameter, and the force acting on the rotation shaft has increased due to the principle of leverage.

An aspect of the present disclosure provides an electronic device and a hinge unit capable of suppressing load from acting on a rotation shaft.

the present disclosure provides an electrical device including a coupling member, a supporting member, a movable member, and a sloped face. The coupling member is provided at a first casing, and is formed with a rotation shaft provided with a protruding portion at an outer peripheral portion thereof. The supporting member is provided at a second casing, and is formed with a shaft hole into which the rotation shaft is inserted. The movable member is provided at the radial direction outside of the rotation shaft and has a restricted movable range about the circumferential direction. The sloped face is formed at a contact portion of the movable member with the protruding portion, and is sloped toward the side closest to the rotation shaft on progression from the rear side toward the front side in the rotation direction when the protruding portion makes contact with the movable member.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an enlarged exploded view of part of a hinge unit of the first exemplary embodiment.

FIG. 9 is a side view of a coupling member of the first exemplary embodiment.

FIG. 17 is an enlarged perspective view of part of a hinge unit of a second exemplary embodiment.

DESCRIPTION OF EMBODIMENTS

First Exemplary Embodiment

Explanation follows regarding a first exemplary embodiment of the present disclosure.

Figure 1:
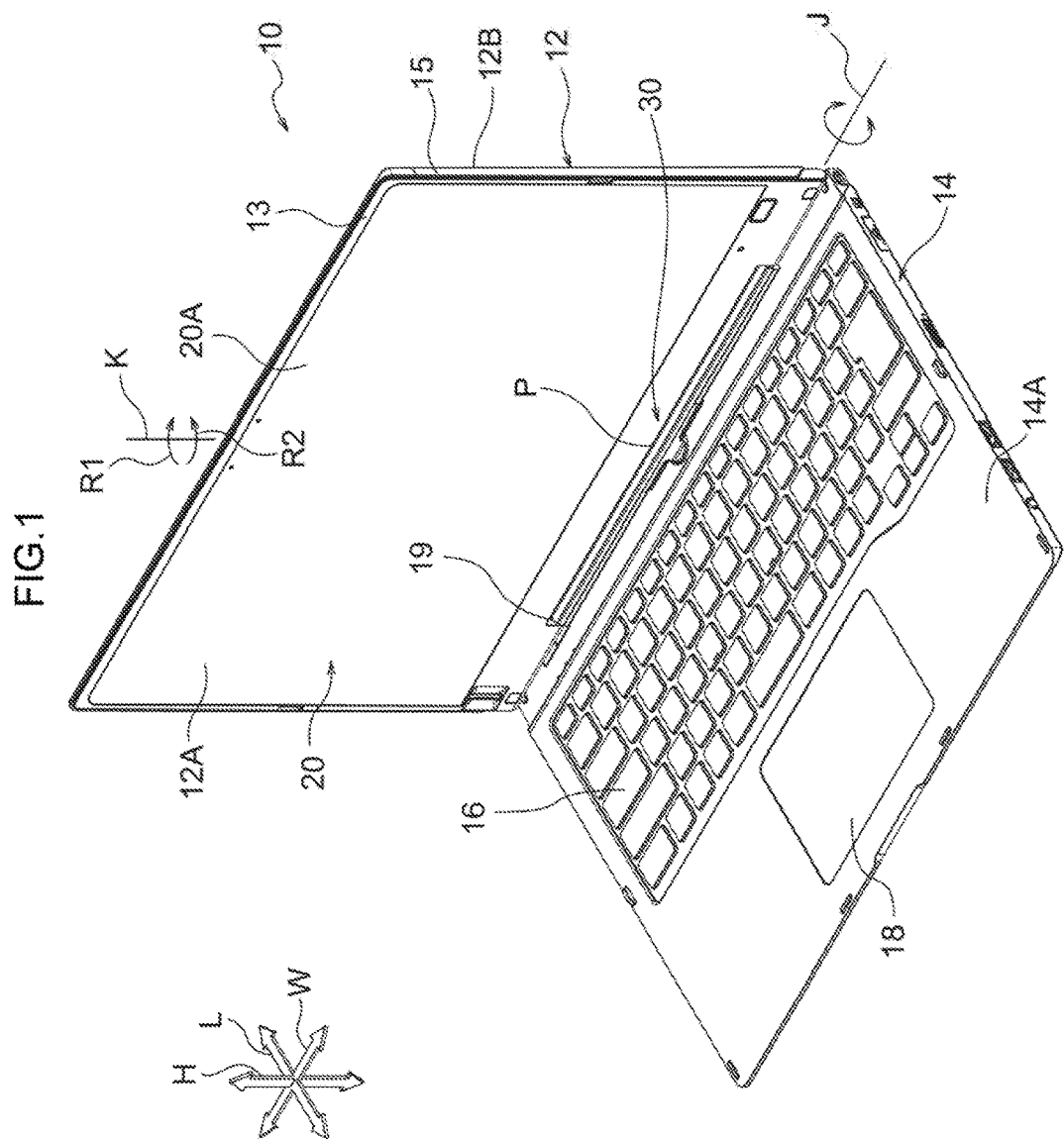
FIG. 1 is a perspective view illustrating an open state of a personal computer of a first exemplary embodiment.

FIG. 1 illustrates a notebook personal computer 10, serving as an example of an electronic device according to the first exemplary embodiment.

The personal computer 10 includes a display casing 12 serving as an example of a first casing, a main body casing 14 serving as an example of a second casing, and a coupling section 30 that couples the display casing 12 and the main body casing 14 together. Note that in each of the drawings, the arrow W indicates the width direction, the arrow L indicates the length direction, and the arrow H indicates the height direction (vertical direction) of the personal computer 10. The W direction, the L direction, and the H direction are orthogonal to each other. Placement of the respective members of the personal computer 10 is described with reference to the right side, left side, front side, rear side, upper side, and lower side, as a display panel 20, described later, is viewed face-on.

As illustrated in FIG. 1, an axial line forming a pivot center in a case in which the display casing 12 is tilted toward the main body casing 14 configures a first axial line J, and an axial line forming a rotation center in a case in which the display casing 12 is rotated with respect to the main body casing 14 configures a second axial line K. The first axial line J is a straight line along the W direction, and the second axial line K is a straight line along the H direction. A position that is at the center of the display casing 12 in the W direction and that is also a position on the first axial line J configures a center position P. As an example, the second axial line K is positioned offset from the center position P toward the L direction front side.

Main Body Casing

As illustrated in FIG. 1, the main body casing 14 is formed in a rectangular shape with its length direction along the W direction in plan view, and is made of metal (a magnesium alloy, for example). A motherboard 25 (see FIG. 2), a battery, a fan, a hard disk (not illustrated in the drawings), and the like are assembled inside the main body casing 14.

Figure 2:
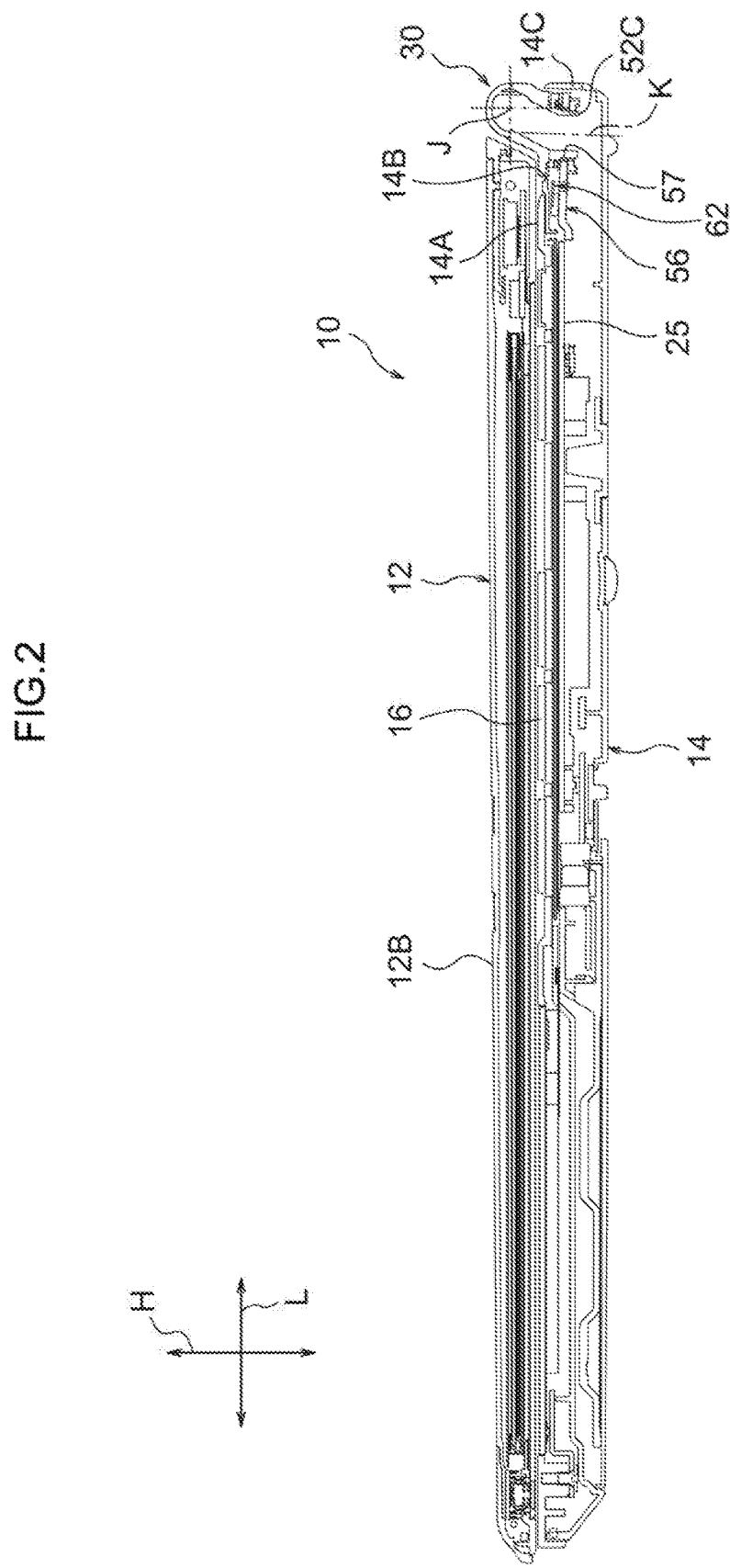
FIG. 2 is a vertical cross-section of a personal computer of the first exemplary embodiment.

Elements of an electronic circuit, such as a central processing unit (CPU) and memory (not illustrated in the drawings) are, for example, mounted on the motherboard 25 (see FIG. 2). The CPU executes various computation processing based on a software program in data that is temporarily stored in the memory. The software program or data is stored on a hard disk (not illustrated in the drawings).

The main body casing 14 includes an upper plate 14A covering the H direction upper side. A keyboard 16 and a touch pad 18, these being input devices serving as an example of an input section where information or a command is input, are disposed on the upper plate 14A. Plural keypads are arrayed on the keyboard 16. In the personal computer 10, a user operates the keyboard 16 or the touch pad 18 to input various commands or data to the abovementioned CPU. A through-hole 14B (see FIG. 2) is formed piercing through in the H direction at the W direction center and L direction rear side of the upper plate 14A.

Display Casing

As illustrated in FIG. 1, the display panel 20, this being a liquid crystal display panel serving as an example of a display section that displays information processing results (images, videos, or the like) executed by the CPU, is incorporated in the display casing 12. The display casing 12 includes a frame shaped front cover 13 that covers an outer peripheral portion of the display panel 20 from the front side, and a back cover 15 that covers the display panel 20 from the rear side. A front face of the display panel 20 configures a display face 20A that displays images, videos, and so on, and is exposed through the inside of the front cover 13.

Various text and graphics are displayed on the display face 20A based on the computation processing by the abovementioned CPU. An input device such as a touch panel is disposed on the display panel 20. For example, various commands and data are input from the touch panel to the CPU by a stylus operation or the fingers of the user.

In a face-on view of the display panel 20, a cutout portion 19 that is cut out in a flattened, inverted U-shape is formed in a lower end portion of the display casing 12. A coupling member 52 (see FIG. 4), described later, is disposed in the cutout portion 19. Namely, the coupling member 52 is provided at the display casing 12.

Note that a state in which the display casing 12 is open at an angle of 90° with respect to the main body casing 14 is referred to as an open state. Note that in the present exemplary embodiment, tilting of the display casing 12 about the first axial line J is referred to as pivoting, and turning of the display casing 12 about the second axial line K is referred to as rotating.

In the display casing 12, a face at the side where the display panel 20 is provided is referred to as a back face 12A, and a face at the opposite side to the display panel 20 is referred to as a front face 12B. The back face 12A and the front face 12B are switched by rotating the display casing 12 by 180° in the arrow R1 direction or the arrow R2 direction about the second axial line K. In plan view of the display casing 12 in a state in which the main body casing 14 is disposed at the front side thereof, the arrow R1 direction is the clockwise direction, and the arrow R2 direction is the counterclockwise direction.

Coupling Section

Figure 3:
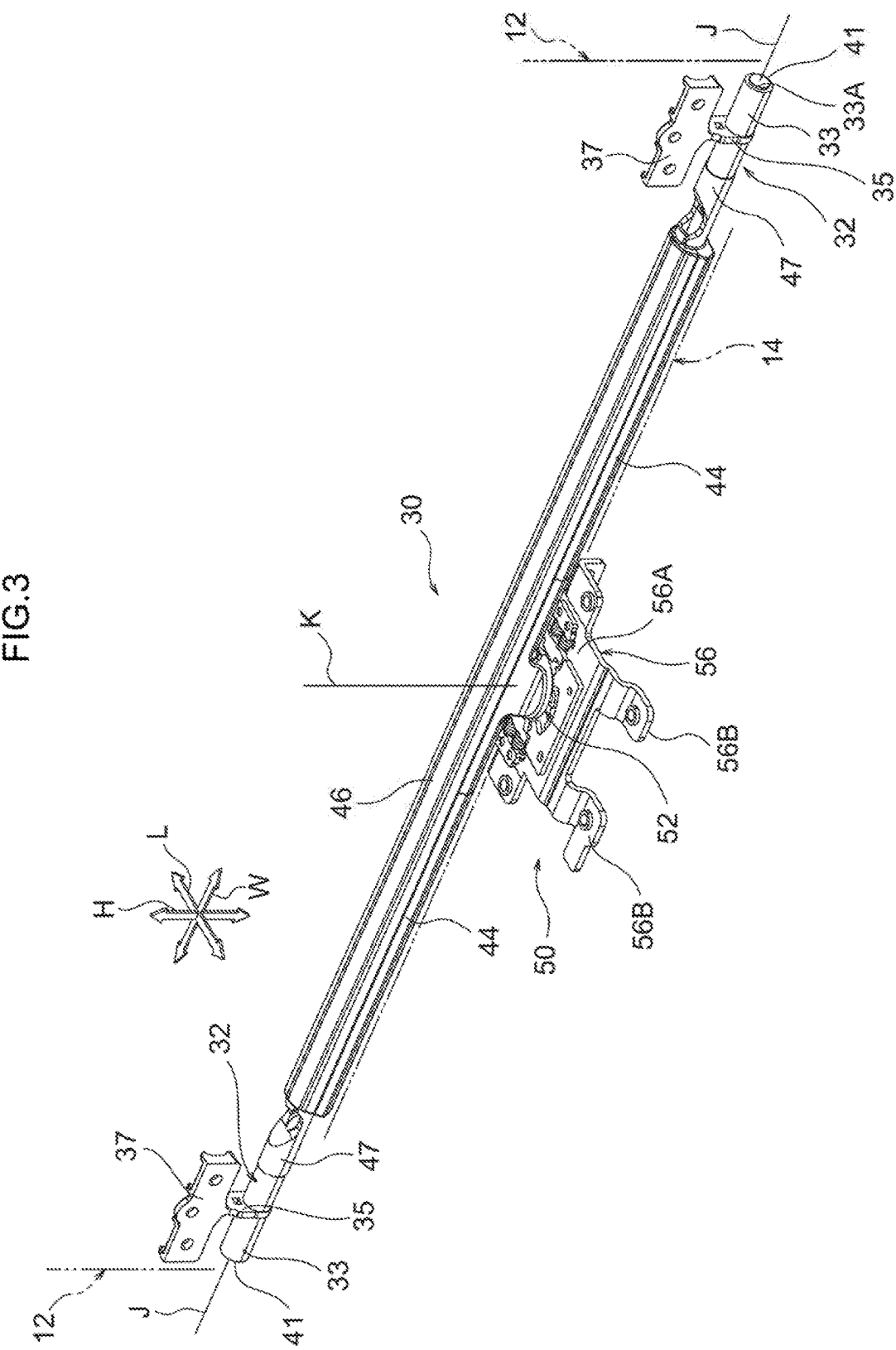
FIG. 3 is a perspective view of a hinge unit of the first exemplary embodiment.

As illustrated in FIG. 3, the coupling section 30 includes, as an example, two pivot sections 32 that pivot about the first axial line J, and a hinge unit 50 that supports the two pivot sections 32. The hinge unit 50 rotates the display casing 12 (see FIG. 1) about the second axial line K.

Pivot Sections

Each pivot section 32 includes a cylinder portion 33 that combines plural springs, a projecting portion 35 project out toward the outside of the cylinder portion 33, and a plate shaped attachment portion 37 that is formed at an end portion of the projecting portion 35. The attachment portion 37 runs along the W-H plane of the display casing 12 in the open state. Note that the pivot sections 32 are disposed at either W direction side of arm members 44, described later.

A through-hole 33A is formed piercing through each cylinder portion 33 in the W direction. A shaft 41, which is attached to the respective arm member 44, is inserted into the through-hole 33A, and a retaining member such as a C ring (not illustrated in the drawings) is provided, such that the cylinder portion 33 pivots with the first axial line J as its pivot center.

The attachment portions 37 are, as an example, fastened by screws (not illustrated in the drawings) to bosses (not illustrated in the drawings) protruding straight out from an inner wall face of the back cover 15 (see FIG. 1) of the display casing 12. Namely, the pivot sections 32 are provided at the display casing 12. Thus, as illustrated in FIG. 2, the display casing 12 pivots (tilts) about the first axial line J with respect to the main body casing 14.

Hinge Unit

Explanation follows regarding the hinge unit 50.

Figure 5:
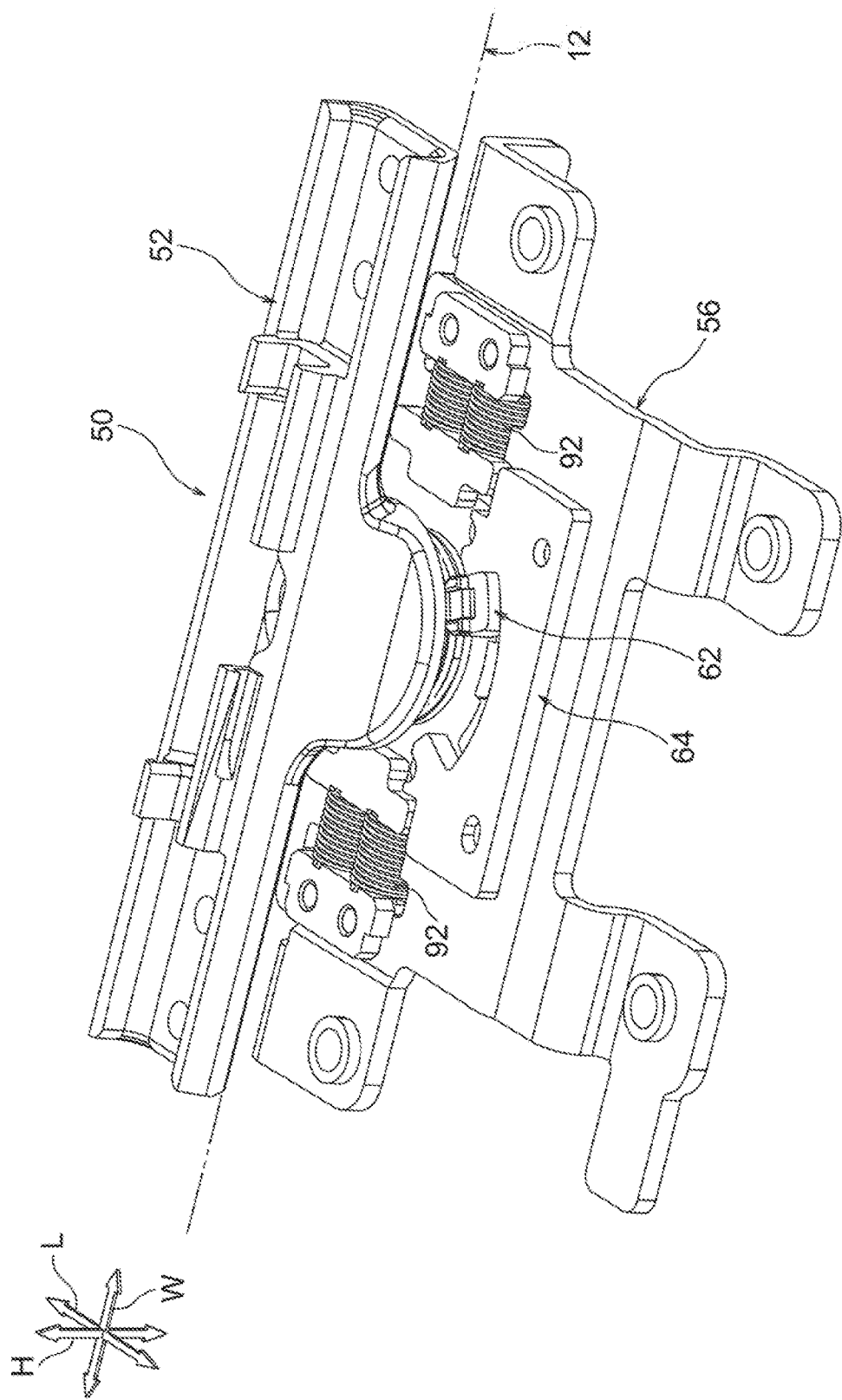
FIG. 5 is an enlarged perspective view of part of a hinge unit of the first exemplary embodiment.

As illustrated in FIG. 5, the hinge unit 50 includes a coupling member 52 that couples together the display casing 12 and the main body casing 14 (see FIG. 1), a base 56 serving as an example of a supporting member that supports the coupling member 52, and a cam member 12 serving as an example of a movable member. The hinge unit 50 also includes a restricting plate 64 serving as an example of a restricting member that restricts movement of the cam member 62.

Coupling Member

Figure 6:
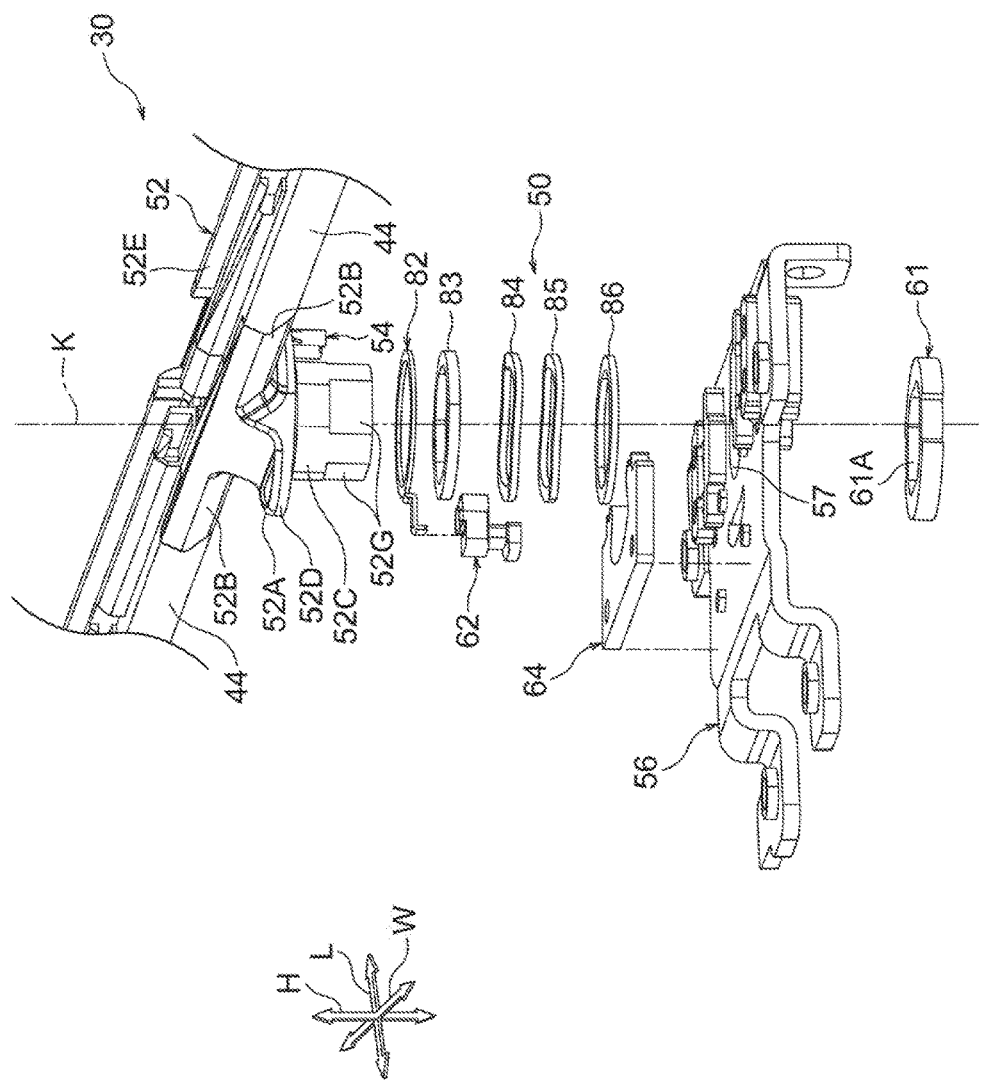
FIG. 6 is an exploded view of part of a hinge unit of the first exemplary embodiment.

As illustrated in FIG. 6, the coupling member 52 includes a circular ring shaped main body portion 52A, and extension portions 52B extending from an H direction upper portion of the main body portion 52A toward either W direction side.

Main Body Portion

A center position of the main body portion 52A is disposed on the second axial line K. The main body portion 52A is formed with a shaft portion 52C, serving as an example of a rotation shaft extending from an H direction lower portion toward the lower side. Namely, as an example, the axial direction of the shaft portion 52C runs along the H direction. Note that in the present exemplary embodiment, an outer peripheral portion 52D of the main body portion 52A is incorporated at an outer peripheral portion of the shaft portion 52C.

Extended Portions

The extension portions 52B are formed with a groove 52E with a U-shaped plane cross-section. Various wiring (not illustrated in the drawings), such as signal wires and power supply wires, is housed inside the groove 52E. As an example, the arm members 44 that support the display casing 12 (see FIG. 1) with their length direction along the W direction are attached to W direction end portions of the respective extension portions 52B by screws (not illustrated in the drawings).

Shaft Portion

The shaft portion 52C is inserted into a shaft hole 57 of the base 56, described later, and rotates about the second axial line K. The shaft portion 52C is formed with a through-hole 52F (see FIG. 10). The through-hole 52F pierces through the shaft portion 52C passes through the main body portion 52A, to as far as the extension portions 52B. The various wiring (not illustrated in the drawings) in the main body casing 14 (see FIG. 1) is thereby connected to the display casing 12 (see FIG. 1) through the through-hole 52F and the groove 52F. Note that the rotation center O (see FIG. 7) of the shaft portion 52C is disposed on the second axial line K.

As an example, cut faces 52G are formed in four locations offset by 90° from each other to portions of a side face (an outside face running along the second axial line K) of the shaft portion 52C. The cut faces 52G are planar faces that are fitted together with hole walls of a fitting hole 61A of a fixed washer 61, described later.

Protruding Portion

As illustrated in FIG. 9, the outer peripheral portion 52D of the coupling member 52 is formed in a flange shape extending from the outer peripheral face of the shaft portion 52C toward the outside in the radial direction. A protruding portion 54 that projects out toward the H direction lower side is provided at a bottom face of part of the outer peripheral portion 52D. The protruding portion 54 is restricted from rotating about the second axial line K (see FIG. 6) by contact with the cam member 62 (see FIG. 5), described later. The protruding portion 54 disposed at a spacing of a distance d in the radial direction of the shaft portion 52C from the outer peripheral face of the shaft portion 52C.

Figure 13:
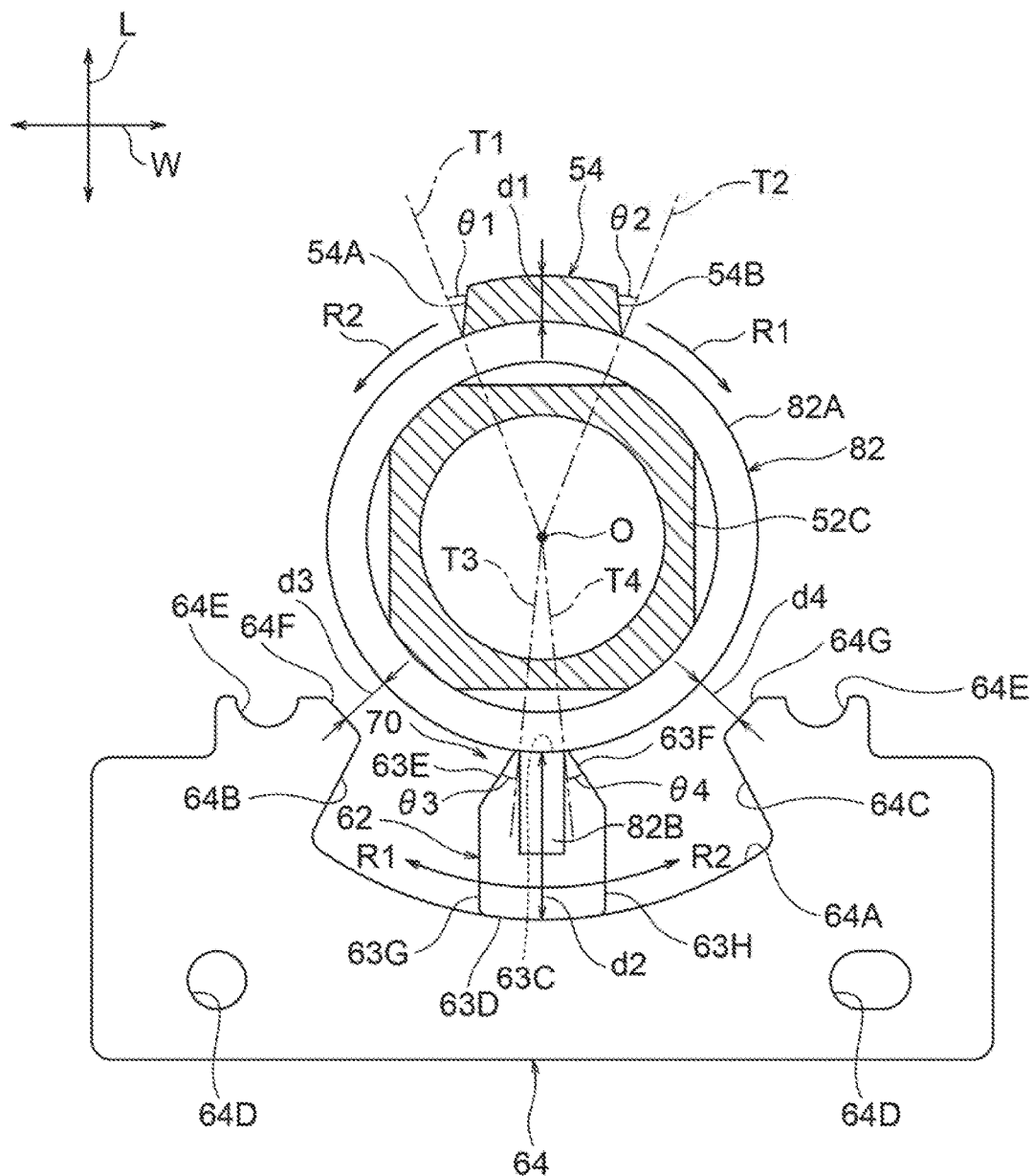
FIG. 13 is a schematic view illustrating placement of a rotation shaft and a cam member of the first exemplary embodiment.

As illustrated in FIG. 13, a contact face 54A and a contact face 54B are formed at locations (both end portions of the protruding portion 54 in the circumferential direction (rotation direction) of the shaft portion 52C) of the protruding portion 54 that contact the cam member 62. In plan view of the protruding portion 54, the contact face 54A slopes at an angle $\theta 1$ with respect to a straight line T1 passing, through the rotation center O and an end portion of the contact face 54A at the side nearest to the rotation center O. In plan view of the protruding portion 54, the contact face 54B slopes at an angle $\theta 2$ with respect to a straight line T2 passing through the rotation center O and an end portion of the contact face 54B at the side nearest to the rotation center O.

In plan view, the contact face 54A and the contact face 54B slope in directions that draw nearer to each on progression from the side nearest to the shaft portion 52C toward the side furthest from the shaft portion 52C. Note that as an example, $\theta 1 = \theta 2$, in the present exemplary embodiment.

Figure 10:
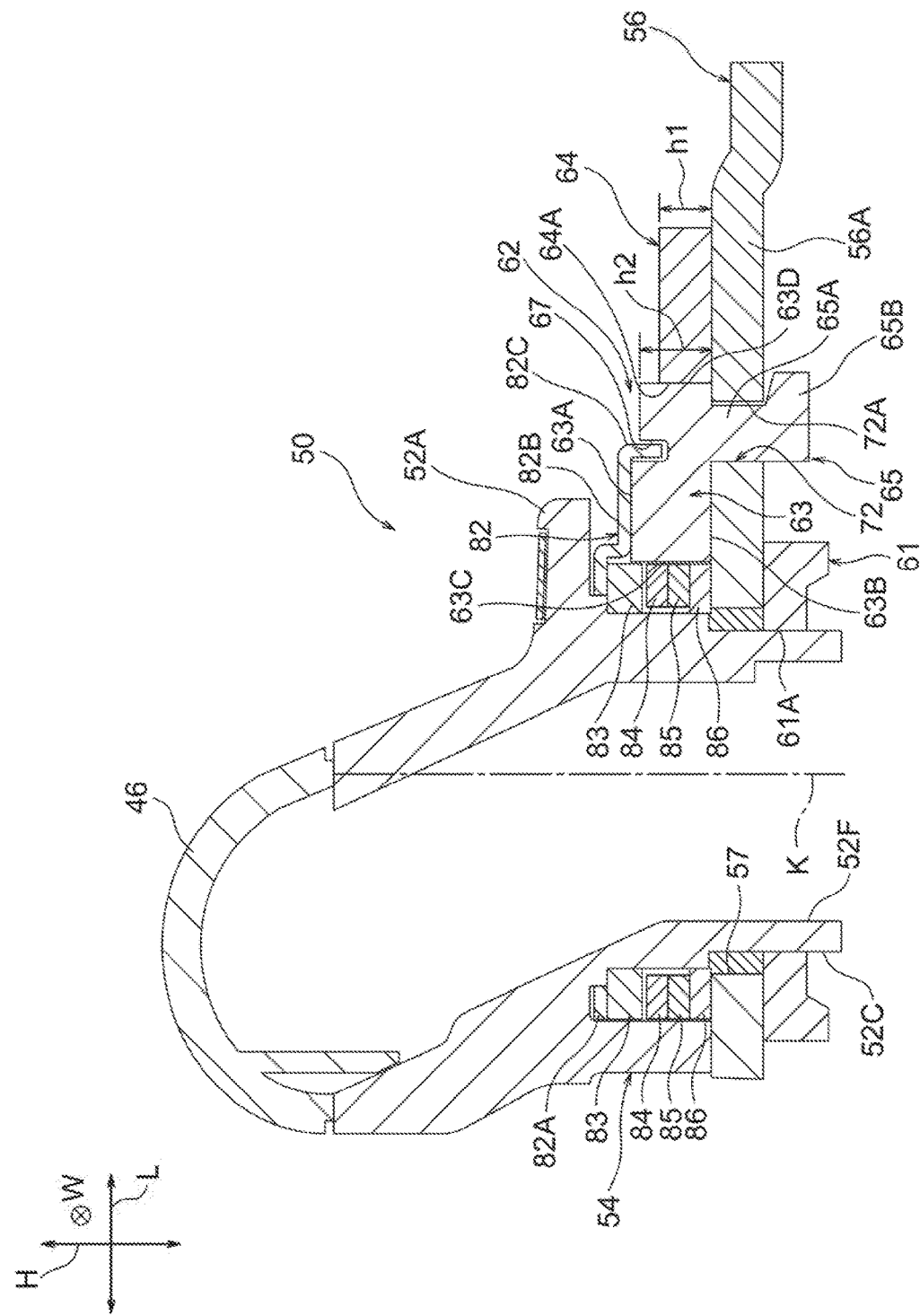
FIG. 10 is vertical cross-section of part of a hinge unit of the first exemplary embodiment.

As illustrated in FIG. 8, the shaft portion 52C is inserted into a free washer 82 serving as an example of a second washer, an adjustment washer 83, a disc spring 84, a disc spring 85, and an adjustment washer 86, in the above sequence from the upper side along the second axial line K. As illustrated in FIG. 10, respective circumferential direction parts of the free washer 82, the adjustment washer 83, the disc spring 84, the disc spring 85, and the adjustment washer 86 are provided between the shaft portion 52C and the protruding portion 54.

Free Washer

As illustrated in FIG. 8, the free washer 82 includes a ring shaped portion 82A forming the main body, a plate shaped arm 82B that extends from the ring shaped portion 82A toward the outside in the radial direction of the ring shaped portion 82A, and a claw 82C formed at a leading end of the arm 82B. The claw 82C is formed by bending the leading end of the arm 82B toward the lower side alongside the second axial line K. The claw 82C is an example of an anchored portion that is anchored in an anchor hole 67 of the cam member 62, described later.

A hole 82D is formed piercing through the free washer 82 along the second axial line K. The internal diameter of the hole 82D is larger than the external diameter of the shall portion 52C. Namely, the free washer 82 rotates relative to the shaft portion 52C, even in as case in which the shaft portion 52C has been inserted into the hole 82D.

The adjustment washer 83 and the adjustment washer 86 are employed as spacers to adjust the H direction height position of the free washer 82. As an example, hole walls are formed in the adjustment washer 83 and the adjustment washer 86, so as make contact with the cut faces 52G of the shaft portion 52C.

The disc spring 84 mid the disc spring 85 are examples of biasing members that bias the free washer 82 in the axial direction of the shaft portion 52C (the direction along the second axial line K) with the adjustment washer 83 interposed therebetween. The disc spring 84 and the disc spring 85 stabilize the orientation of the free washer 82 along the horizontal plane. Note that the disc spring 84 and the disc spring 85 may directly bias the free washer 82; however, in the present exemplary embodiment, the free washer 82 is biased with the adjustment washer 83 interposed therebetween, such that rotation of the free washer 82 relative to the shaft portion 52C is not suppressed.

In the example of the present exemplary embodiment, the respective external diameters of the free washer 82, the adjustment washer 83, the disc spring 84, the disc spring 85, and the adjustment washer 86 are substantially the same size.

Arm Members

Figure 4:
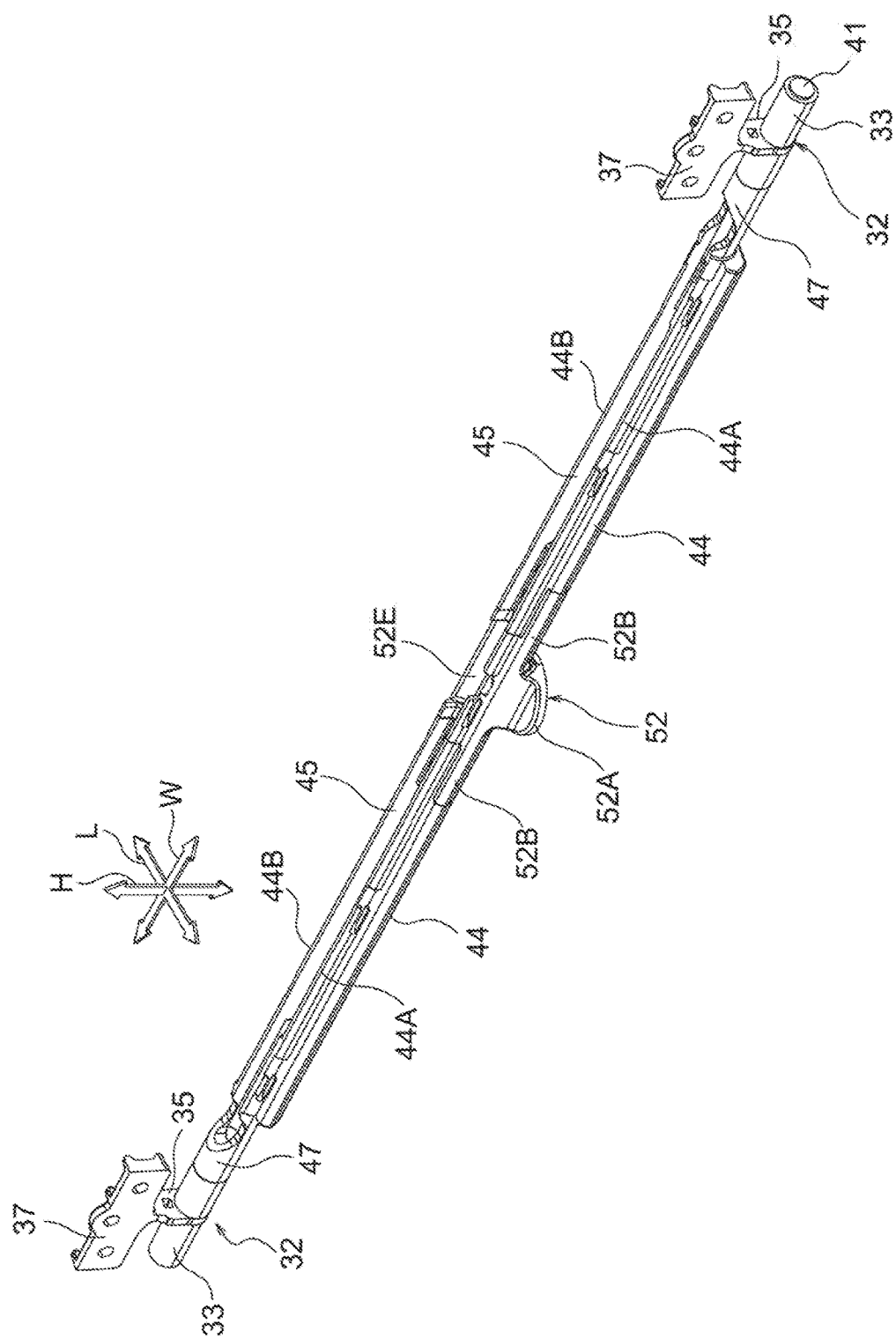
FIG. 4 is a perspective view illustrating a hinge unit of the first exemplary embodiment, in a state in which a cover member of the hinge unit has been removed.

As illustrated in FIG. 4, the two arm members 44 are members with their length direction along the W direction, and are fastened by screws (not illustrated in the drawings) to the W direction end portions of the respective extension portions 52E of the coupling member 52. Each arm member 44 is formed with a groove 45 extending along the W direction and open toward the H direction upper side. The grooves 45 and the groove 52E of the coupling member 52 are linked together. An upper portion of each arm member 44 is formed with a side wall 44A and a side wall 44B that protrude straight out along the H direction.

The side wall 44A and the side wall 44B are disposed facing each other with their length direction in the W direction and a spacing in the L direction therebetween. A cover member 46 (see FIG. 3) is fitted onto the side walls 44A and the side walls 44B. The cover member 46 covers the grooves 45, and the groove 52E of the coupling member 52.

A circular tube shaped supporting portion 47 is provided at a W direction end portion of each arm member 44. The supporting portions 47 are open toward the W direction outside, and the respective shafts 41 are fitted into and fixed to the supporting portions 47. Namely, the shafts 41 project out from W direction end portions of the respective arm members 44 toward the W direction outsides, such that the pivot sections 32 pivot about the shafts 41 as previously described.

Base

Figure 7:
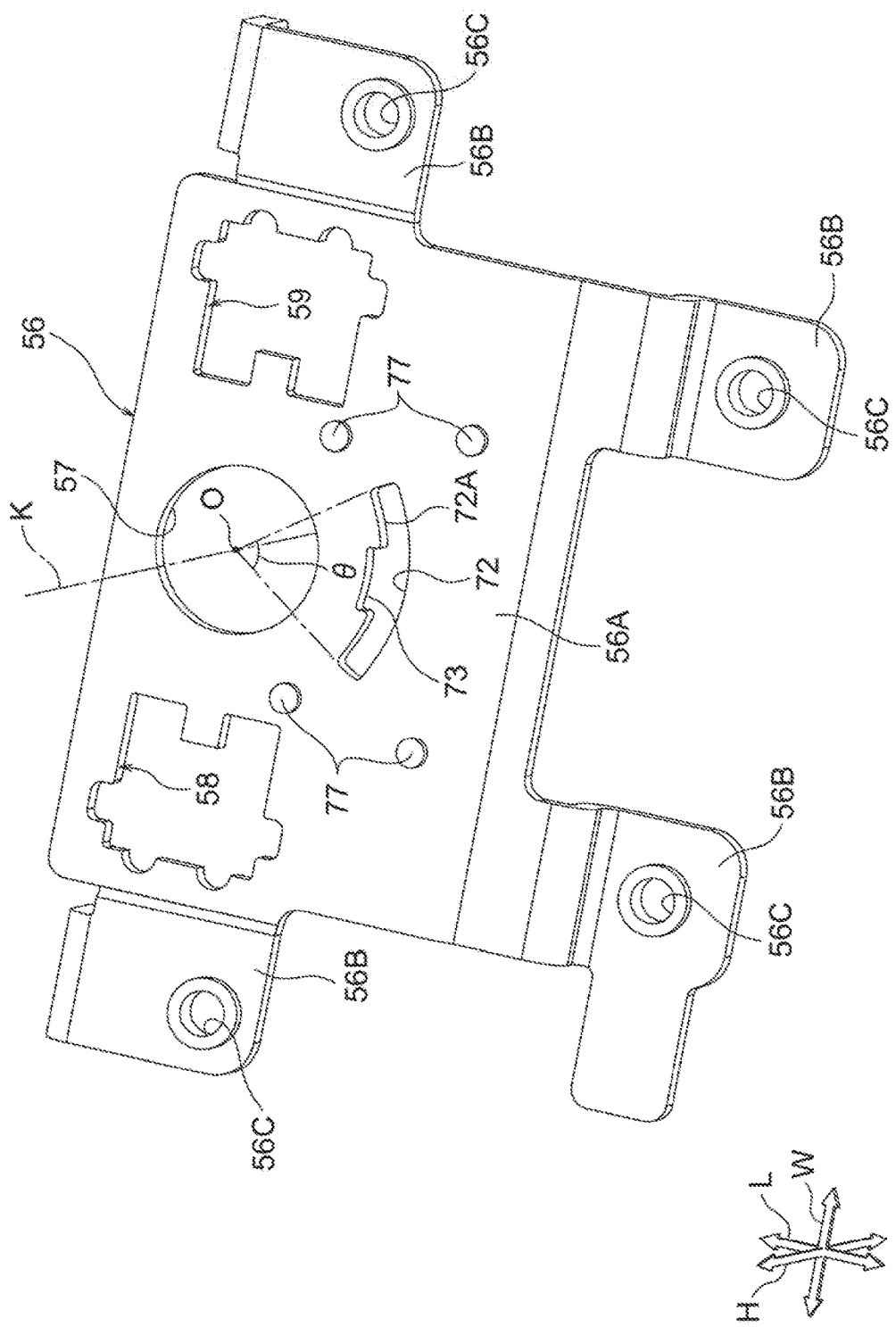
FIG. 7 is a perspective view of a base of the first exemplary embodiment.

As illustrated in FIG. 7, as an example, the base 56 is configured of metal plate. The base 56 includes a plate shaped portion 56A with a planar face running along the W-L plane, and fastening portions 56B that are each bent in a crank shape at a peripheral edge of the plate shaped portion 56A. The circular shaped shaft hole 57 is formed piercing through in the H direction about the second axial line K at the W direction center and L direction rear side of the plate shaped portion 56A. The above-described shaft portion 52C (see FIG. 9) is inserted into the shaft hole 57. The base 56 supports the coupling member 52 (see FIG. 3), such that the coupling member 52 rotates about the second axial line K. Note that a hole 56C is formed piercing through each fastening portion 56B in the H direction.

The base 56 is also turned with a hole portion 58 and a hole portion 59, which pierce through the plate shaped portion 56A in the H direction at the respective W direction outsides of the shaft hole 57. Springs 92 (see FIG. 5), which cause a pressing force to act on the shaft portion 52C (see FIG. 9), are housed inside the hole portion 58 and the hole portion 59.

The base 56 is also formed with a through-hole 72 piercing through the plate shaped portion 56A in the H direction at the outside (L direction front side) of the shaft hole 57. Viewed in the H direction, the through-hole 72 is formed in a circular arc shape running along the circumferential direction of the shaft hole 57. Specifically, as an example, a center angle $\theta$ of the circular arc of the through-hole 72 about the rotation center O is 60°. A hole wall 72A of the through-hole 72 is formed with a cutout portion 73 that is cut out along the radial direction of the shaft portion 52C (see FIG. 9). As an example, the cutout portion 73 is cut out from the shaft hole 57 side at the center of the through-hole 72.

The plate shaped portion 56A of the base 56 is also formed with circular column shaped projection portions 77 projecting out toward the H direction upper side at four locations at the periphery of the through-hole 72.

Note that, as an example, the base 56 is fixed inside the main body casing 14 by fastening the fastening portions 56B to an inner wall face of the main body casing 14 (see FIG. 2) through brackets (not illustrated in the drawings) using screws (not illustrated in the drawings). Namely, the base 56 is provided at the main body casing 14.

Fixed Washer

As illustrated in FIG. 6, as an example, the fixed washer 61 is a ring shaped member made of metal. As illustrated in FIG. 10, the fixed washer 61 is formed with the fitting hole 61A that is fitted together with the shaft portion 52C. The fixed washer 61 is fixed to the shaft portion 52C by fitting the shaft portion 52C together with the fitting hole 61A at the lower side of the base 56, and rotates together with the shaft portion 52C. Note that the fixed washer 61 acts as a retaining member that suppresses the shaft portion 52C from coming out of the shaft hole 57.

Cam Member

As illustrated in FIG. 8, as an example, the cam member 62 is a block body made of metal. The cam member 62 is disposed further toward the L direction center side of the main body casing 14 (see FIG. 1) than the shaft portion 52C. The cam member 62 includes a main body portion 63, and a hook portion 65 formed at the lower side of the main body portion 63.

Main Body Portion

In plan view, the main body portion 63 has a leading end side in the radial direction of the shaft portion 52C (the side nearest to the shaft portion 52C) formed in a trapezoidal shape, and a rear end side formed in a rectangular shape. The main body portion 63 includes an upper face 63A at the H direction upper side, and a bottom face 63B at the lower side. As illustrated in FIG. 13, the main body portion 63 also includes a front side face 63C, a rear side face 63D, a sloped face 63E, a sloped face 63F, a left side face 63G, and a right side face 63H, as side faces. Namely, the main body portion 63 is formed with a pair of sloped faces 63E, 63F. As illustrated in FIG. 8, the main body portion 63 is also formed with the anchor hole 67 serving as an example of an anchor portion, and a groove 69.

As illustrated in FIG. 10, the front side face 63C is disposed facing an outer peripheral face of the adjustment washer 83, an outer peripheral face of the adjustment washer 86, an outer peripheral face of the disc spring 84, and an outer peripheral face of the disc spring 85 in the radial direction of the shaft portion 52C. As an example, the front side face 63C has a curved face in a recessed shape toward the rotation center O (see FIG. 13).

As illustrated in FIG. 13, the rear side face 63D is disposed further toward the outside in the radial direction of the shaft portion 52C than the front side face 63C. The rear side face 63D has curved face in a protruding shape toward the outside. Note that a clearance is provided between the rear side face 63D and a guide wall 64A of the restricting plate 64, described later, in order for the cam member 62 to be moved smoothly.

The sloped face 63E is formed at a contact portion 70 of the cam member 62 with the protruding portion 54. The sloped face 63F is formed contiguously to a left end of the front side face 63C in the circumferential direction of the shaft portion 52C. In a plan view of the cam member 62, the sloped face 63E is formed at an angle $\theta 3$ with respect to a straight line T3 passing through the rotation center O and an end portion of the sloped face 63E at the side nearest to the rotation center O.

Figure 14A:
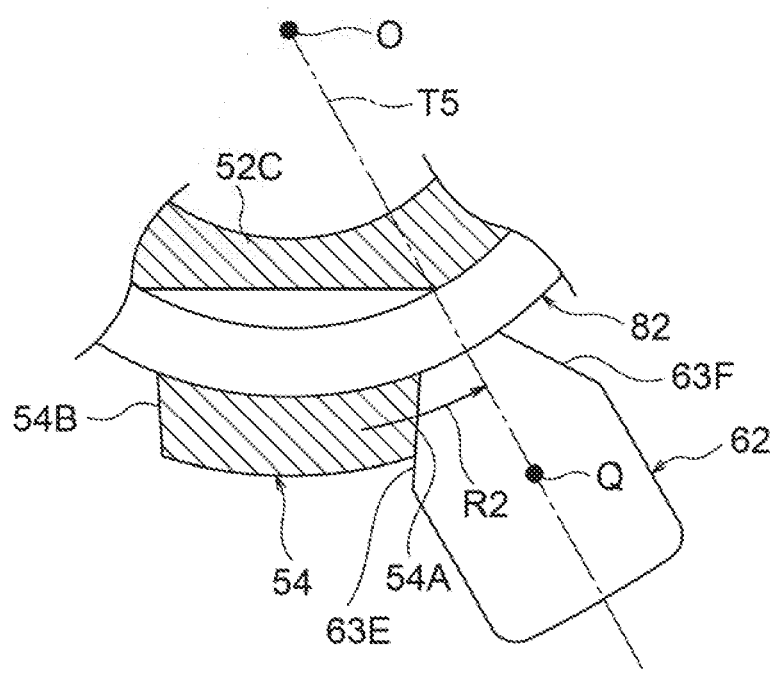
FIG. 14A is a schematic view illustrating one sloped face of a cam member of the first exemplary embodiment.

Specifically, as illustrated in FIG. 14A, the sloped face 63E is sloped toward the side nearest the shaft portion 52C on progression from the rear side toward the front side in the rotation direction (arrow R2 direction) in a case in which the protruding portion 54 makes contact with the cam member 62. In other words, where T5 is a straight line linking the rotation center O to a center Q forming the center of the cam member 62 in plan view, an end portion of the sloped face 63E positioned at the inside in the radial direction of the shaft portion 52C is sloped nearer to the side nearest to the straight line T5 than an end portion of the sloped face 63E positioned at the outside.

As illustrated in FIG. 13, the sloped face 63F is formed at the contact portion 70 of the cam member 62 with the protruding portion 54. The sloped the 63F is formed contiguously to a right end of the front side face 63C in the circumferential direction of the shaft portion 52C. In plan view of the cam member 62, the sloped face 63F is sloped at an angle θ4 with respect to a straight fine 14 passing through the rotation center O and an end portion of the sloped face 63F at the side nearest to the rotation center O.

Figure 14B:
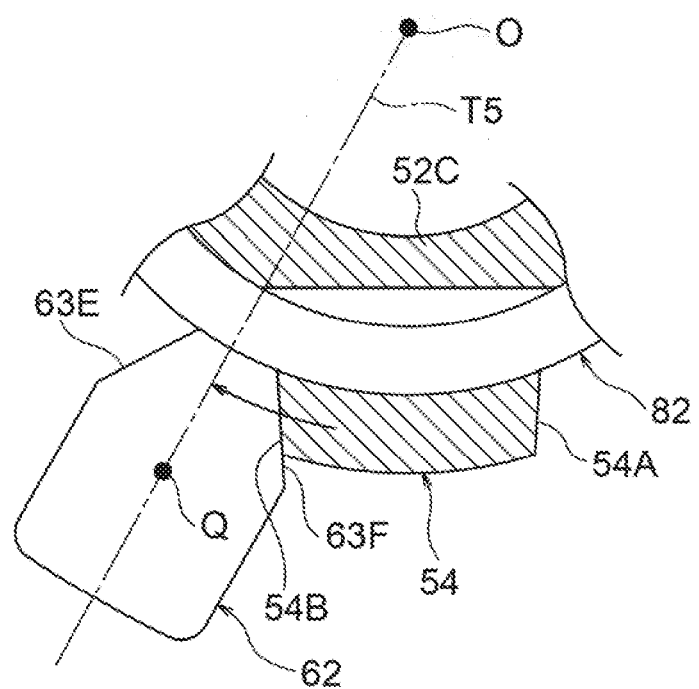
FIG. 14B is a schematic view illustrating the other sloped face of a cam member of the first exemplary embodiment.

Specifically, as illustrated in FIG. 14B, the sloped face 63F is sloped toward the side nearest to the shaft portion 52C on progression from the rear side toward the front side in the rotation direction (arrow R1 direction) in a case in which the protruding portion 54 makes contact with the cam member 62. In other words, an end portion of the sloped face 63F positioned at the inside in the radial direction of the shaft portion 52C is sloped nearer to the side nearest to the straight line T5 than an end portion of the sloped face 63F positioned at the outside.

As illustrated in FIG. 13, in a plan view of the cam member 62, a spacing between the pair that is the sloped face 63E and the sloped face 64F widens along the circumferential direction of the shaft portion 52C on progression away from the outer peripheral face of the shaft portion 52C. In the example of the present exemplary embodiment, θ1=θ2=θ3=θ4. Namely, in the present exemplary embodiment, the protruding portion 54 and the cam member 62 come into face-to-face contact with each other, regardless of the whether the protruding portion 54 is rotated in the R1 direction, or in the R2 direction. Note that d1<d2, where d1 is the length of the protruding portion 54 and d2 is the length of the cam member 62 in the radial direction of the shaft portion 52C.

The left side face 63G is formed running along the radial direction of the shaft portion 52C from a left end of the sloped face 62E to a left end of the rear side face 63D in the circumferential direction of the shaft portion 52C.

The right side face 63H is formed running along the radial direction of the shaft portion 52C from a right end of the sloped face 63F to a right end of the rear side face 63D in the circumferential direction of the shaft portion 52C.

As illustrated in FIG. 8, as an example, the anchor hole 67 is formed in the center of the upper face 63A of the main body portion 63. The anchor hole 67 is of a size that anchors the claw 82C of the free washer 82.

The groove 69 is formed further toward a leading end side of the upper face 63A than the anchor hole 67. Specifically, the groove 69 is formed with a U-shaped cross-section by the upper face 63A, and a set of all portions 69A, 69B that protrude straight out in the H direction on top of the upper face 63A with a spacing in the circumferential direction of the shaft portion 52C therebetween. The spacing between the wall portion 69A and the wall portion 69B is larger than the width of the arm 82B in the circumferential direction of the shaft portion 52C. Namely, the claw 82C of the free washer 82 is anchored in the anchor hole 67 to stow the arm 2B in the groove 69.

Hook Portion

As illustrated in FIG. 10, the hook portion 65 is formed at the bottom face 63B further toward the outside (one side) in the radial direction of the shaft portion 52C than the center of the main body portion 63. As an example, the hook portion 65 includes an insertion portion 65A that is inserted into the through-hole 72 (see FIG. 7), and an extension portion 65B that extends from a lower end of the insertion portion 65A along the radial direction of the shaft portion 52C.

The insertion portion 65A is a column shaped portion that extends from the bottom face 63B toward the lower side. The length of the insertion portion 65A along the H direction from the bottom face 63B to the extension portion 65B is longer than the thickness of the plate shaped portion 56A. The extension portion 65B extends toward the outside in the radial direction of the shaft portion 52C. The hook portion 65 hooks onto the hole wall 72A of the through-hole 72 due to the insertion portion 65A being inserted into the through-hole 72, and the plate shaped portion 56A being sandwiched between the main body portion 63 and the extension portion 65B.

Note that the cam member 62 is disposed between the guide wall 64A of the restricting plate 64, described later, and the shaft portion 52C, and moves over the plate shaped portion 56A. Specifically, the cam member 62 is disposed between the guide wall 64A, and the adjustment washer 83, disc spring 84, disc spring 85, and adjustment washer 86. Namely, the cam member 62 is provided at the radial direction outside of the shaft portion 52C, and a movable range in the circumferential direction is restricted (limited) by the restricting plate 64.

Restricting Plate

As illustrated in FIG. 6, the restricting plate 64 that restricts rotation of the coupling member 52 about the second axial line K to within a set range by contact with the cam member 62 is provided at the H direction upper side of the base 56. Note that as an example, the restricting plate 64 restricts the coupling member 52 from rotating to an angle larger than 180°, but does not restrict the coupling member 52 from rotating to an angle of 180° or less.

As illustrated in FIG. 10, the restricting plate 64 is a plate member with its thickness direction along the H direction. As an example, a height h1 of the restricting plate 64 is shorter than a height h2 of the main body portion 63 of the cam member 62 in the H direction. As illustrated in FIG. 13, the restricting plate 64 includes the guide wall 64A that has a circular arc shape in plan view, and terminal walls 64B, 64C formed at circumferential direction terminal ends (either end) of the guide wall 64A. The guide wall 64A, the terminal wall 64B, and the terminal wall 64C are portions of a side face of the restricting plate 64.

The guide wall 64A has a curved face that curves so as to run parallel to the circumferential direction of the free washer 82. The guide wall 64A is disposed facing the outer peripheral faces of the adjustment washer 83, the disc spring 84, the disc spring 85 and the adjustment washer 86 (see FIG. 8) in the radial direction of the shaft portion 52C. As an example, a center angle of the circular arc of the guide wall 64A corresponding to the rotation center O is set within a range from 60° to 90°. When moved, the cam member 62 is guided about the shaft portion 52C by moving such that the rear side face 63D faces the guide wall 64A.

The terminal wall 64B and the terminal wall 64C respectively extend along directions intersecting the circumferential direction of the guide wall 64A from the circumferential direction terminal ends of the guide wall 64A. The slope angles of the terminal wall 64B and the terminal wall 64C with respect to the radial direction of the shaft portion 52C are set such that the left side face 63G of the cam member 62 and the terminal wall 64B come into face-to-face contact, and that the right side face 63H of the cam member 62 and the terminal wall 64C come into face-to-face contact. Movement of the cam member 62 is thereby restricted in a case in which the left side face 63G contacts the terminal wall 64B, and in a case in which the right side face 63H contacts the terminal wall 64C.

The restricting plate 64 is also formed with two through-holes 64D and to indented portions 64E in the periphery of the guide wall 64A, the terminal wall 64B, and the terminal wall 64C. The restricting plate 64 is fixed on the base 56 in a state in which the projection portions 77 of the base 56 are inserted into the through-holes 64D and the indented portions 64E. The restricting plate 64 may be fixed to the base 56 by fastening using either adhesive or screws.

The restricting plate 64 is also formed with a side wall 64F running along the circumferential direction of the adjustment washer 86 (see FIG. 8) horn an end portion of the terminal wall 64B at the opposite side to the guide wall 64A. The restricting plate 64 is also formed with a side wall 64G running along the circumferential direction of the adjustment washer 86 (see FIG. 8) from an end portion of the terminal wall 64C at the opposite side to the guide wall 64A.

Note that in the example of the present exemplary embodiment, d1<d3=d4<d2, where d3 is the distance between the side all 64F and the outer peripheral face of the adjustment washer 86 (see FIG. 10), and d4 is the distance between the side wall 64G and the outer peripheral face of the adjustment washer 86. As previously described, d1 is the length of the protruding portion 54, and d2 is the length of the cam member 62 in the radial direction of the shaft portion 52C. The protruding portion 54 is thereby capable of rotating 360° about the rotation center O.

Explanation follows regarding operation of the first exemplary embodiment.

Hinge Unit Assembly

Figure 11:
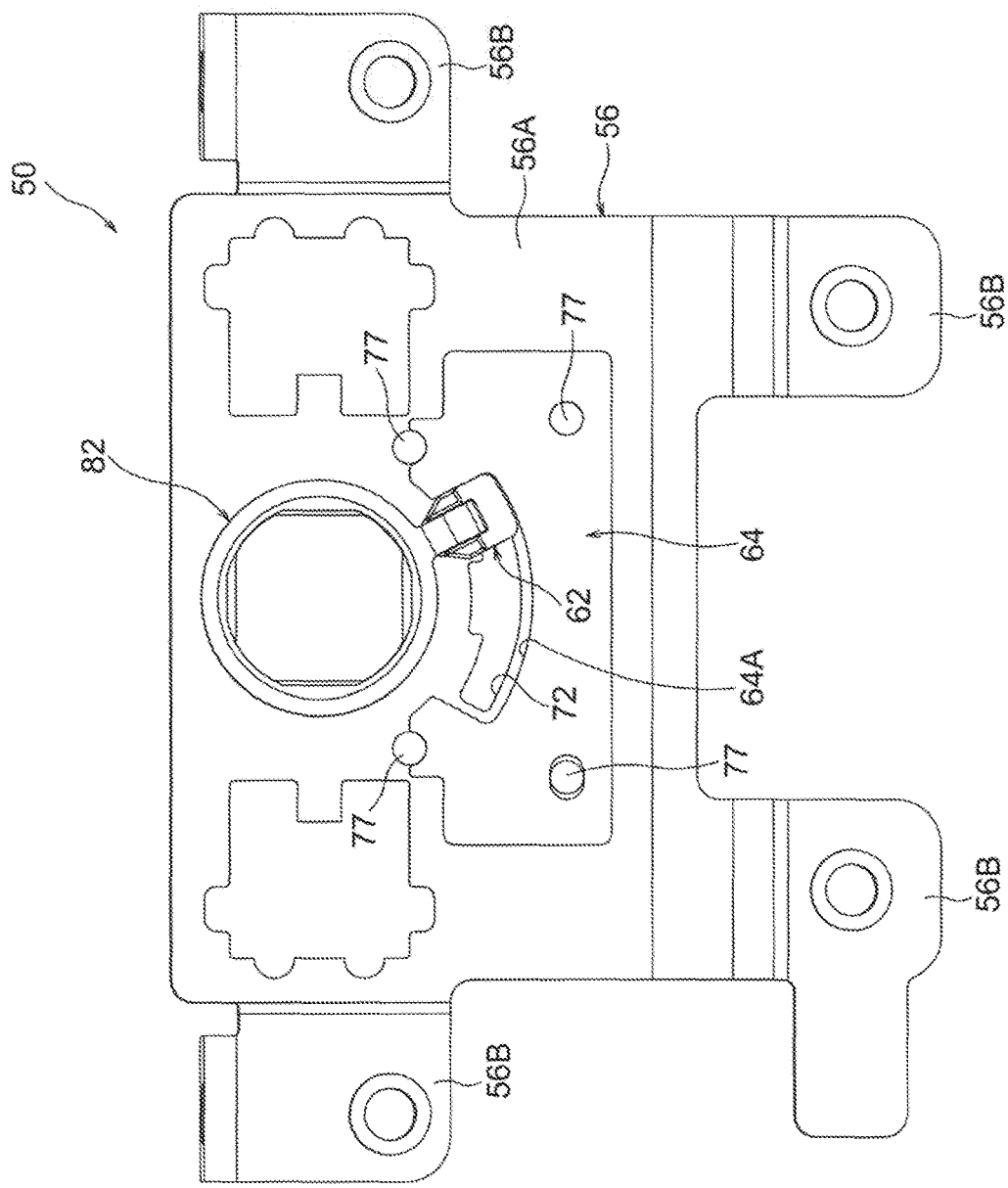
FIG. 11 is a plan view of part of a hinge unit of the first exemplary embodiment.

As illustrated in FIG. 11, the restricting plate 64 is fixed to the plate shaped portion 56A of the base 56 by the method previously described. Next, as illustrated in FIG. 10, the cam member 62 is provided at the plate shaped portion 56A by hooking the hook portion 65 onto the hole wall 72A of the through-hole 72.

Next, the shaft portion 52C is inserted into the free washer 82, the adjustment washer 83, the disc spring 84, the disc spring 85, and the adjustment washer 86 that are in a superimposed state. The shaft portion 52C is then inserted into the shaft hole 57 of the base 56. The main body portion 52A of the coupling member 52 is accordingly disposed at the front side (H direction upper side) of the base 56, and the end portion of the shaft portion 52C projects out at the back side (H direction lower side) of the base 56.

Next, the shaft portion 52C is fitted together with the fitting hole 61A of the fixed washer 61, such that the coupling member 52 is rotatably supported by the base 56. In a case in which this is performed, the cam member 62 is disposed between the restricting plate 64 and the adjustment washer 83, disc spring 84, disc spring 85, and adjustment washer 86, the rear side face 63D is disposed facing the guide wall 64A, and movement of the cam member 62 in the radial direction of the shaft portion 52C is restricted.

Next, the arm 82B of the free washer 82 is stowed in the groove 69 (see FIG. 8), and the claw 82C is anchored in the anchor hole 67 of the cam member 62. The cam member 62 and the free washer 82 thereby form an integral unit, and rotate (move independently in the circumferential direction) relative to the rotation of the shaft portion 52C. The hinge unit 50 is formed in this manner.

Note that, as illustrated in FIG. 13, the movement range of the cam member 62 is restricted (limited) to a range in the circumferential direction of the shaft portion 52C from a position where the left side face 63G and the terminal wall 64B are in contact with each other, to a position where the right side face 63H and the terminal wall 64C are in contact with each other.

Hinge Unit Operation

Explanation follows regarding a case in which, for example, in the personal computer 10 (see FIG. 1) in the open state as illustrated in FIG. 13, the protruding portion 54 is positioned at the opposite side of the rotation center O to a center position of the guide will 64A.

Figure 15A:
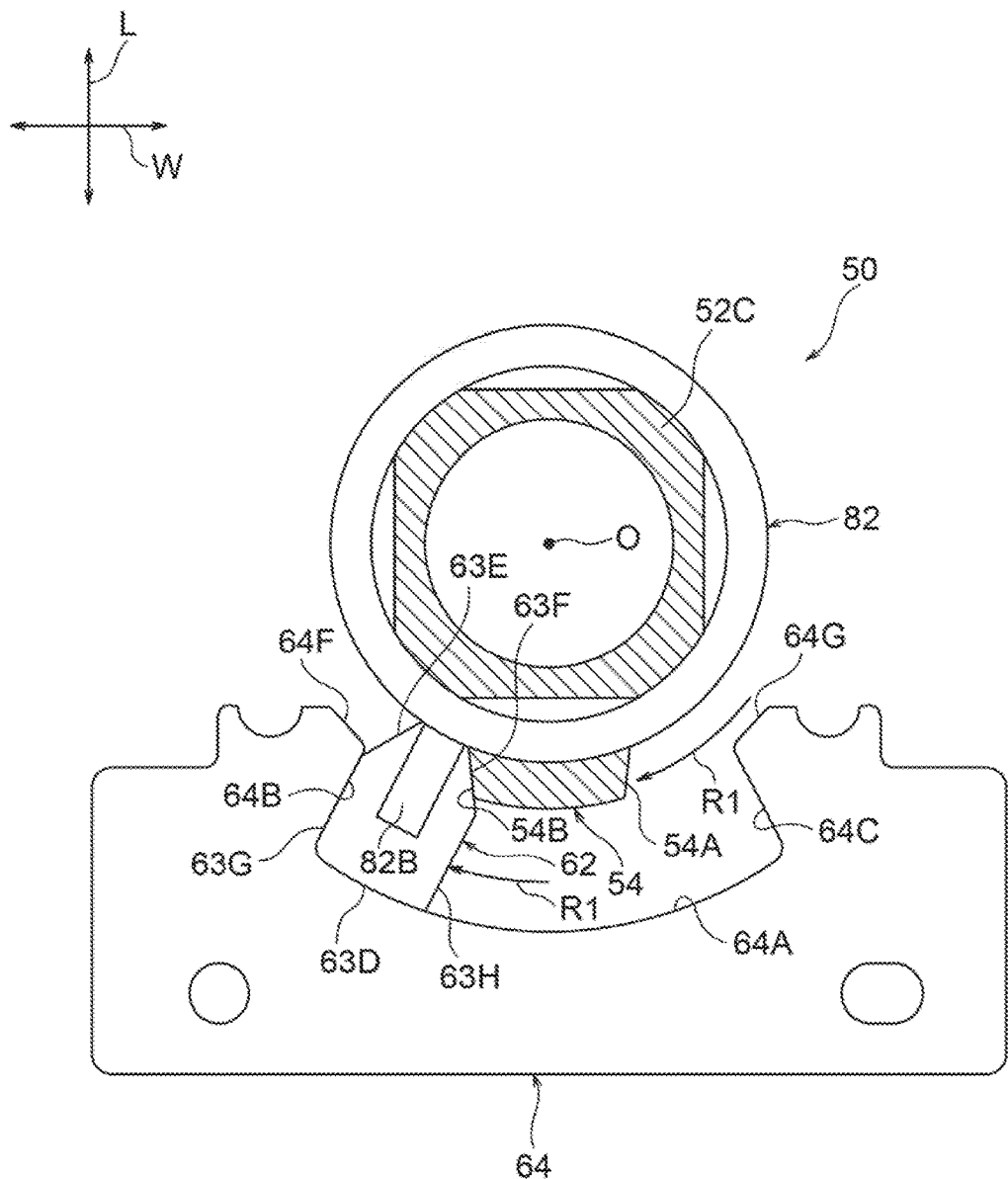
FIG. 15A is a schematic view illustrating a state in which a rotation shaft and a cam member of the first exemplary embodiment have moved to one side.

In the personal computer 10 as illustrated in FIG. 1, in a case in which the display casing 12 is rotated 180° in the arrow RR direction about the second axial line K, the shaft portion 52C rotates in the arrow R1 direction about the rotation center O as illustrated in FIG. 15A. As this occurs, the free washer 82 and the cam member 62 are not linked to the shaft portion 52C, and so do not move.

Next, after the protruding portion 54 has passed between the adjustment washer 83 and so on (see FIG. 8) and the side wall 64G, the contact face 54B of the protruding portion 54 makes contact with the sloped face 63F of the cam member 62. The cam member 62 is accordingly pressed in the arrow R1 direction by the protruding portion 54, and moves along the guide wall 64A until the left side face 63G and the terminal wall 64B make contact with each other. The cam member 62 is restricted from moving, and the protruding portion 54 stops moving due to the left side face 63G and the terminal wall 64B making contact with each other. Rotation of the display casing 12 (see FIG. 1) by 180° in the arrow R1 direction is thereby complete.

Figure 16A:
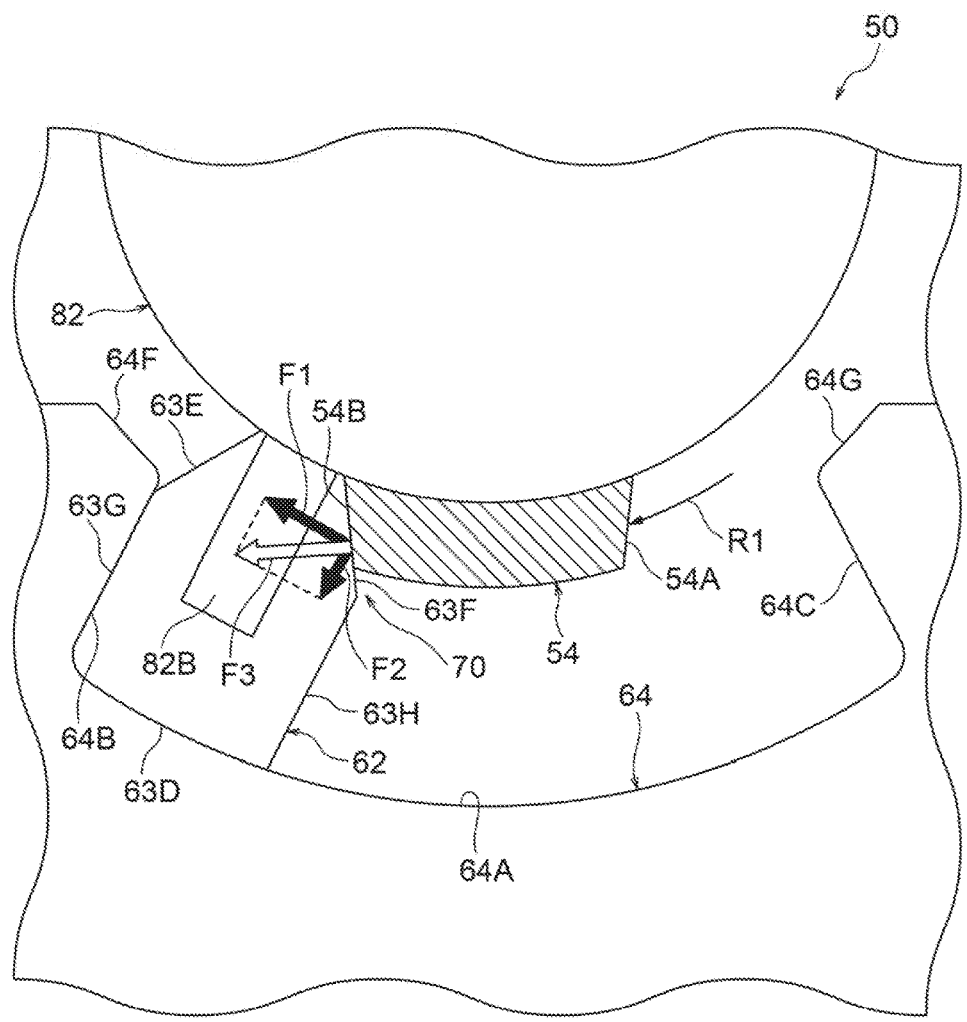
FIG. 16A is a schematic view illustrating force acting on a block body from a protruding portion of a rotation shaft when a rotation shaft and a can member of the first exemplary embodiment have moved to one side.

Note that, as illustrated in FIG. 16A, in a case in which the contact face 54B of the protruding portion 54 has made contact with the sloped face 63F of the cam member 62, a force F1 in a circular tangential direction about the rotation center O (see FIG. 13) and a force F2 toward the outside in the radial direction act on the cam member 62. Namely, as force F3, this being the combined force of the force F1 and the force F2, acts on the cam member 62.

The force F3 acts in a compression direction that compresses the cam member 62, and acts on the restricting plate 64 through the terminal wall 64B. The restricting plate 64 resists the force F3. Thus, the force F3 (load) acting on the contact portion 70 between the protruding portion 54 and the cam member 62 acts on the cam member 62 further toward the outside than a movement trajectory (not illustrated in the drawings) of the protruding portion 54. This enables load to be suppressed from acting on the shaft portion 52C (see FIG. 13) in the personal computer 10 (see FIG. 1) and the hinge unit 50.

Figure 15B:
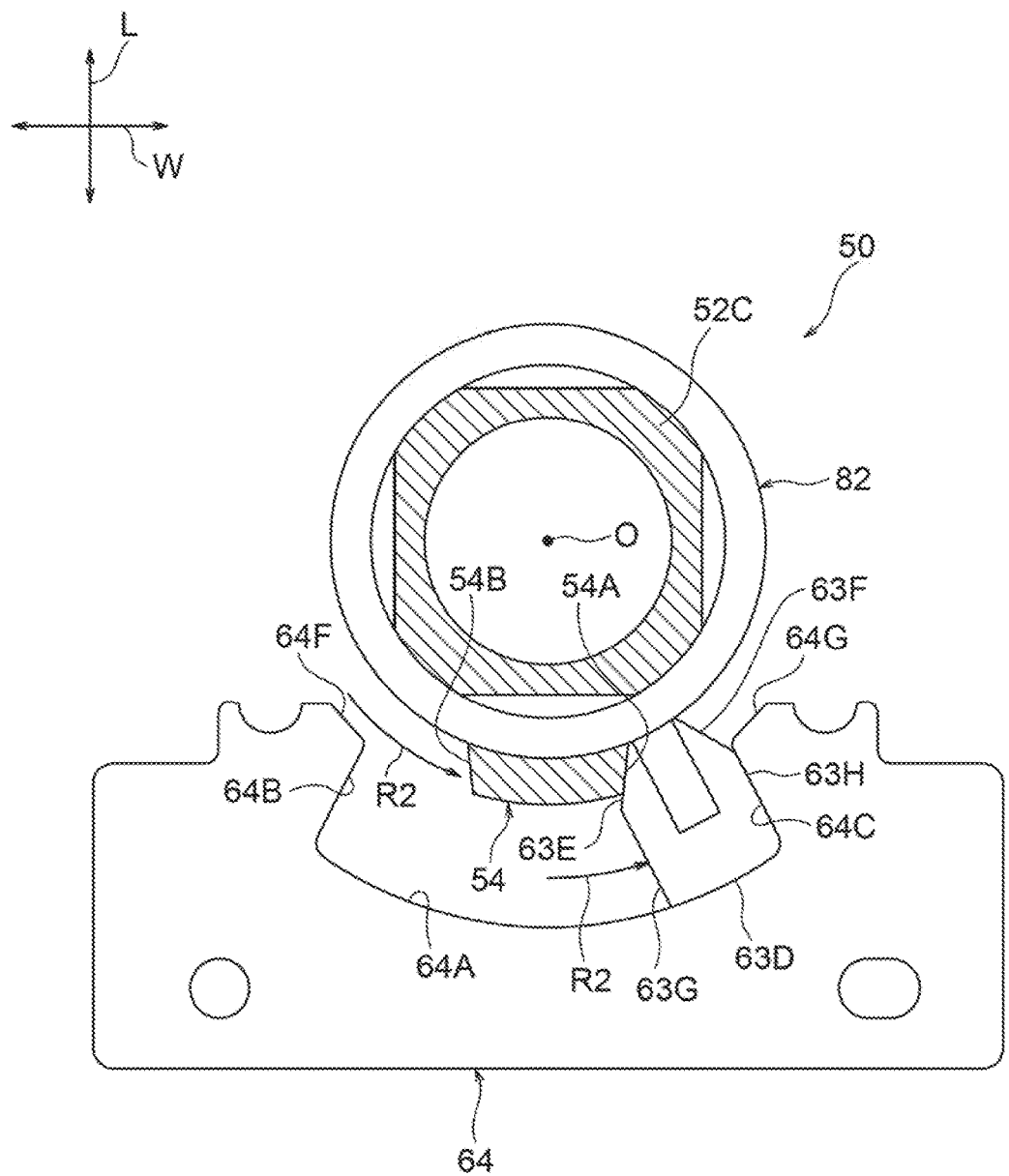
FIG. 15B is a schematic view illustrating a state in which a rotation shaft and a cam number of the first exemplary embodiment have moved to the other side.

In contrast, in the personal computer 10 as illustrated in FIG. 1, in a case in which the display casing 12 is rotated by 180° in the arrow R2 direction about the second axial line K, the shaft portion 52C rotates in the arrow R2 direction about the rotation center O as illustrated in FIG. 15B. As this occurs, the free washer 82 and the cam member 62 are not linked to the shaft portion 52C, and so do not move.

Figure 12:
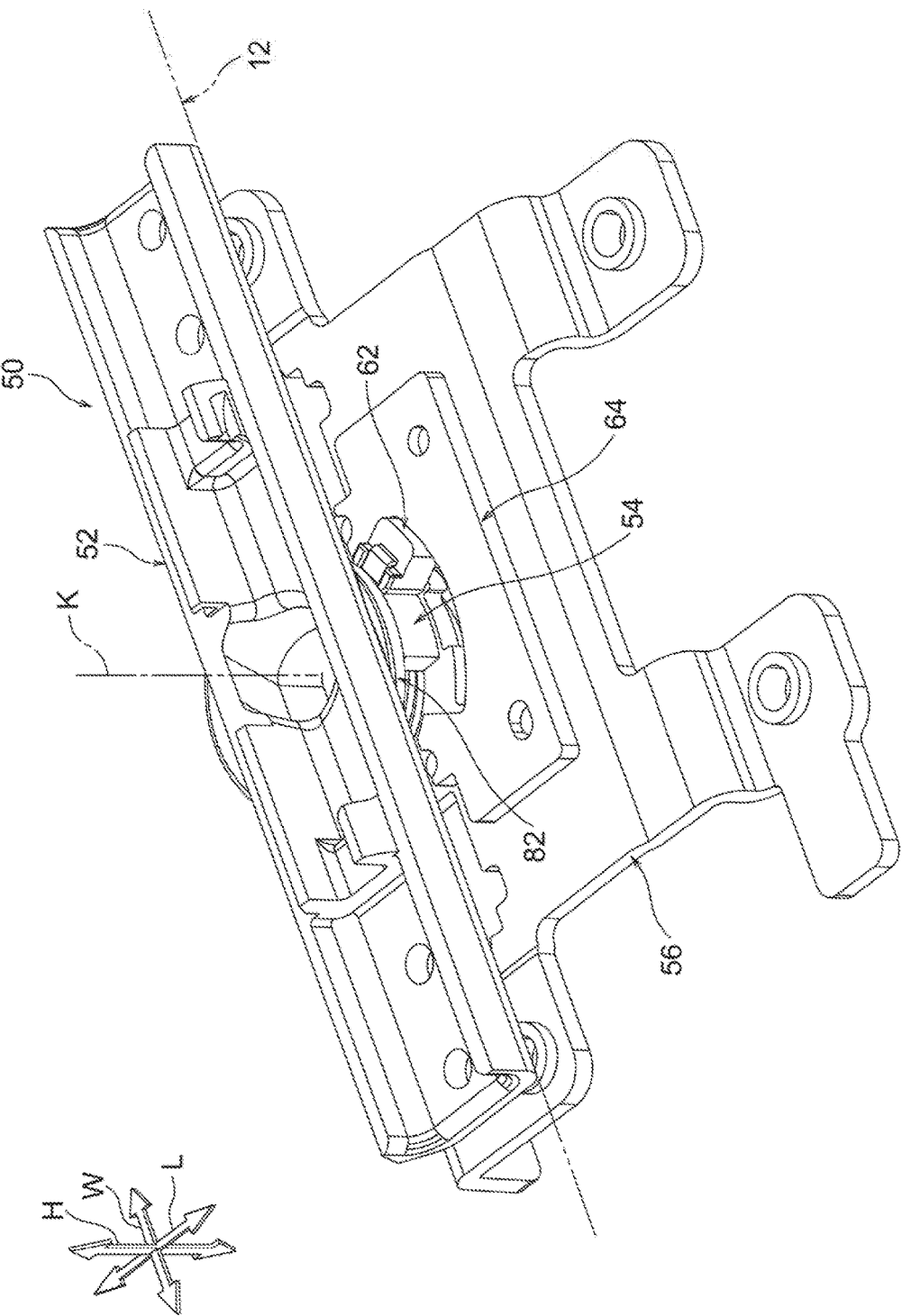
FIG. 12 is an enlarged perspective view of part of a hinge unit of the first exemplary embodiment.

Next, after the protruding portion 54 has passed between the adjustment washer 83 and so on (see FIG. 8) and the side wall 64F, the contact face 54A of the protruding portion 54 makes contact with the sloped face 63E of the cam member 62. The cam member 62 is accordingly pressed in the arrow R2 direction by the protruding portion 54, and moves along the guide wall 64A until the right side face 63H and the terminal wall 64C make contact with each other. The cam member 62 is restricted from moving, and the protruding portion 54 (see FIG. 12) stops moving due to the right side face 63H and the terminal wall 64C making contact with each other. Rotation of the display casing 12 (see FIG. 1) by 180° in the arrow R2 direction is thereby complete.

Figure 16B:
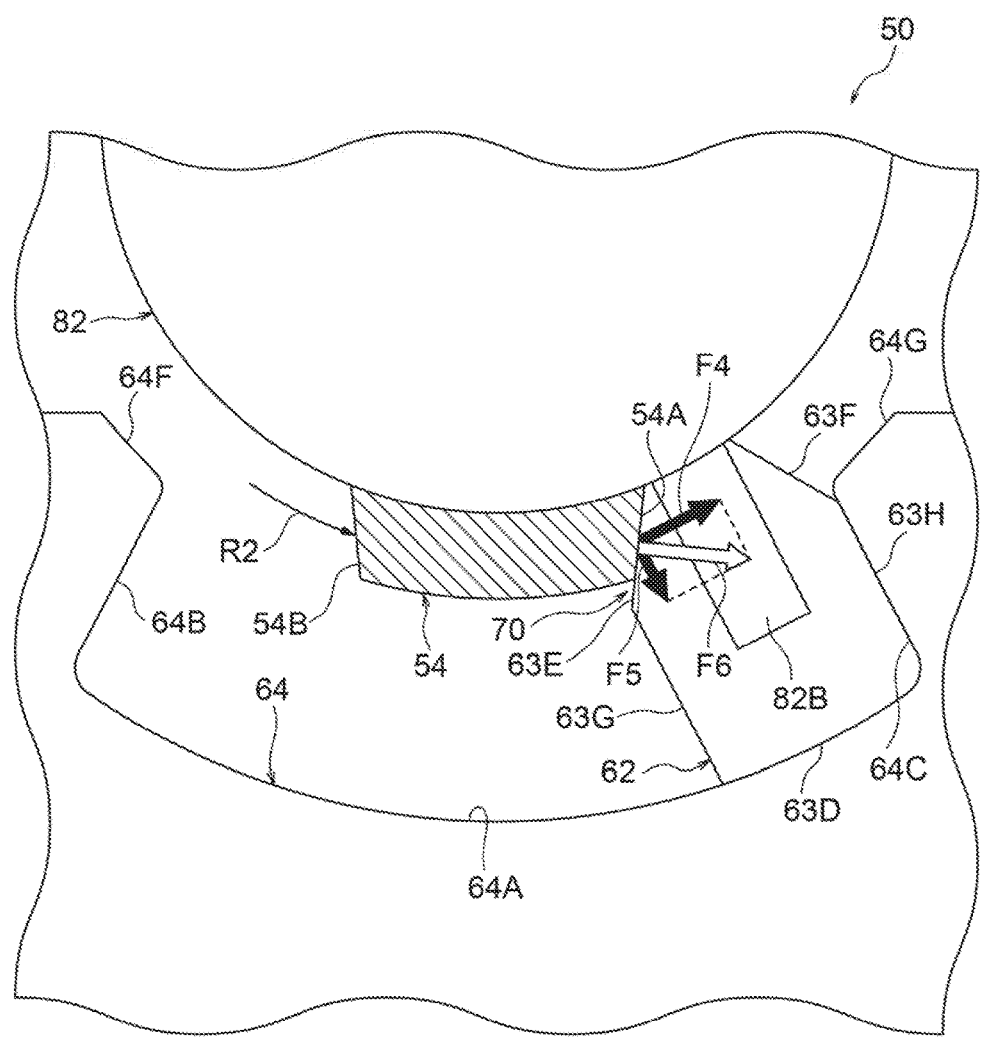
FIG. 16B is a schematic view illustrating force acting on a block body from a protruding portion of a rotation shaft when a rotation shaft and a cam member of the first exemplary embodiment have moved to the other side.

Note that as illustrated in FIG. 16B, in a case in which the contact face 54 of the protruding portion 54 has made contact with the sloped face 63E of the cam member 62, a force F4 in a circular tangential direction about the rotation center O (see FIG. 13) and a force F5 toward the outside in the radial direction act on the cam mender 62. Namely, a force F6, this being the combined force of the force F4 and the force F5, acts on the cam member 62.

The force F6 acts in a compression direction that compresses the cam member 62, and acts on the restricting plate 64 through the terminal wall 64C. The restricting plate 64 resists the force F6. Thus, the force F6 (load) acting on the contact portion 70 between the protruding portion 54 and the cam member 62 acts on the cam member 62 further toward the outside than a movement trajectory (not illustrated in the drawings) of the protruding portion 54. This enables load to be suppressed from acting on the shaft portion 52C (see FIG. 13) in the personal computer 10 (see FIG. 1) and the hinge unit 50.

In the personal computer 10, the shaft portion 52C can be made smaller in diameter, and the hinge unit 50 can be made smaller in size, since the load acting on the shaft portion 52C (see FIG. 13) is suppressed.

In the personal computer 10, the force F1 and the force F4 that act in a tangential direction are borne by the cam member 62 rather than by the arm 82B of the free washer 82. This enables force acting on the free washer 82 to be suppressed in the personal computer 10, compared to configurations that do not include the cam member 62. The free washer 82 can be made thinner in the personal computer 10 due to the force acting on the free washer 82 being suppressed, thereby enabling the hinge unit 50 to be made smaller in size.

In the personal computer 10, the movement range of the cam member 62 is restricted by attaching the plate shaped restricting plate 64 formed with the guide wall 64A, the terminal wall 64B (see FIG. 13), and the terminal wall 64C to the base 56 (see FIG. 5). This enables the movement range of the cam member 62 to be restricted using a simple configuration in the personal computer 10, compared to configurations in which a member that guides the cam member 62 and a member that stops the cam member 62 are separately provided.

In the personal computer 10, as illustrated in FIG. 13, the cam member 62 is a block member, and the cam member 62 is sandwiched between the guide wall 64A and the shaft portion 52C (including the adjustment washer 83 and so on (see FIG. 8)). This enables the cam member 62 to be suppressed from moving away from the movement range in the personal computer 10.

In the personal computer 10, as illustrated in FIG. 2, the cam member 62 is disposed further toward the center side of the main body casing 14 than the shaft portion 52C. This enables the position of the shaft portion 52C in the L direction to be brought nearer to a side face 14C (a side face at the rear side) of the main body casing 14. This enables the from face 12B of the display casing 12 and the side face 14C of the main body casing 14 to be aligned with each other and the appearance of the personal computer 10 to be improved.

In the personal computer 10, as illustrated in FIG. 10, the cam member 62 is restricted from moving upward due to the claw 82C of the free washer 82 being anchored in the anchor hole 67 of the cam member 62. Namely, the cam member 62 can be suppressed from rising in the axial direction (H direction) of the shaft portion 52C in the personal computer 10.

In the personal computer 10, since the anchor hole 67 is formed at the upper face 63A of the cam member 62, it is easy to check the position of the anchor hole 67. This facilitates the anchoring operation of the claw 82C in the anchor hole 67.

In the personal computer 10, the claw 82C that is anchored in the anchor hole 67 is thrilled at the leading end of the arm 82B that juts out from the outer periphery of the free washer 82. There is accordingly no need to perform the anchoring operation of the claw 82C in the anchor hole 67 at a location near to the shaft portion 52C, thereby further facilitating the anchoring operation of the claw 82C in the anchor hole 67.

In the personal computer 10, as illustrated in FIG. 8, the groove 69 is formed at the upper face 63A of the cam member 62. The wall portion 69A and the wall portion 69B of the groove 69 are disposed at either side of the arm 82B. Thus, even in a state in which the arm 82B moves relative to the cam member 62 in the rotation direction of the shaft portion 52C, the arm 82B is restricted from moving in the rotation direction by the groove 69. This enables positional misalignment of the arm 82B with respect to the cam member 62 to be suppressed in the personal computer 10.

In the personal computer 10, as illustrated in FIG. 10, the free washer 82, the adjustment washer 83, the adjustment washer 86, the disc spring 84, and the disc spring 85 are present between the shaft portion 52C and the protruding portion 54. An increase in the height of the shaft portion 52C in the H direction is thereby suppressed, even in a case in which the shaft portion 52C is inserted into the free washer 82, the adjustment washer 83, the adjustment washer 86, the disc spring 84, and the disc spring 85. This enables an increase in the height of the personal computer 10 to be suppressed.

In the personal computer 10, the free washer 82 is supported by the biasing force of the disc spring 84 and the disc spring 85 in the H direction (axial direction), thereby enabling the orientation of the free washer 82 along the W-L plane to be maintained.

In the personal computer 10, as illustrated in FIG. 10, the hook portion 65 of the cam member 62 hooks onto the hole wall 72A of the through-hole 72. The cam member 62 is accordingly restricted from moving in the H direction and the radial direction, thereby enabling the cam member 62 to be suppressed from moving away from the movement range toward the outside.

In the personal computer 10, as illustrated in FIG. 7, the cutout portion 73 is formed at the through-hole 72 so as to widen the width of the hole, thereby facilitating the insertion operation when the hook portion 65 is inserted into the through-hole 72 (see FIG. 8).

In the personal computer 10, as illustrated in FIG. 8, the extension portion 65B of the hook portion 65 extends toward the outside in the radial direction from the insertion portion 65A. The extension portion 65B accordingly contacts the plate shaped portion 56A of the base 56 and is restricted from moving in a case in which the insertion portion 65A is moved in the H direction, thereby enabling the cam member 62 to be suppressed from rising with respect to the base 56.

In the personal computer 10, as illustrated in FIG. 1, the display casing 12 that includes the display panel 20 is coupled to the main body casing 14 through the hinge unit 50 (see FIG. 5). Thus, force is suppressed from acting on the shaft portion 52C (see FIG. 6) when the display casing 12 has been rotated tar about the second axial line K. This enables force to be suppressed from acting on the shaft portion 52C even in a case in which the shaft portion 52C is made smaller in diameter, thereby enabling the personal computer 10 to be made smaller in size.

Second Exemplary Embodiment

Explanation follows regarding a second exemplary embodiment of the present disclosure.

Figure 18:
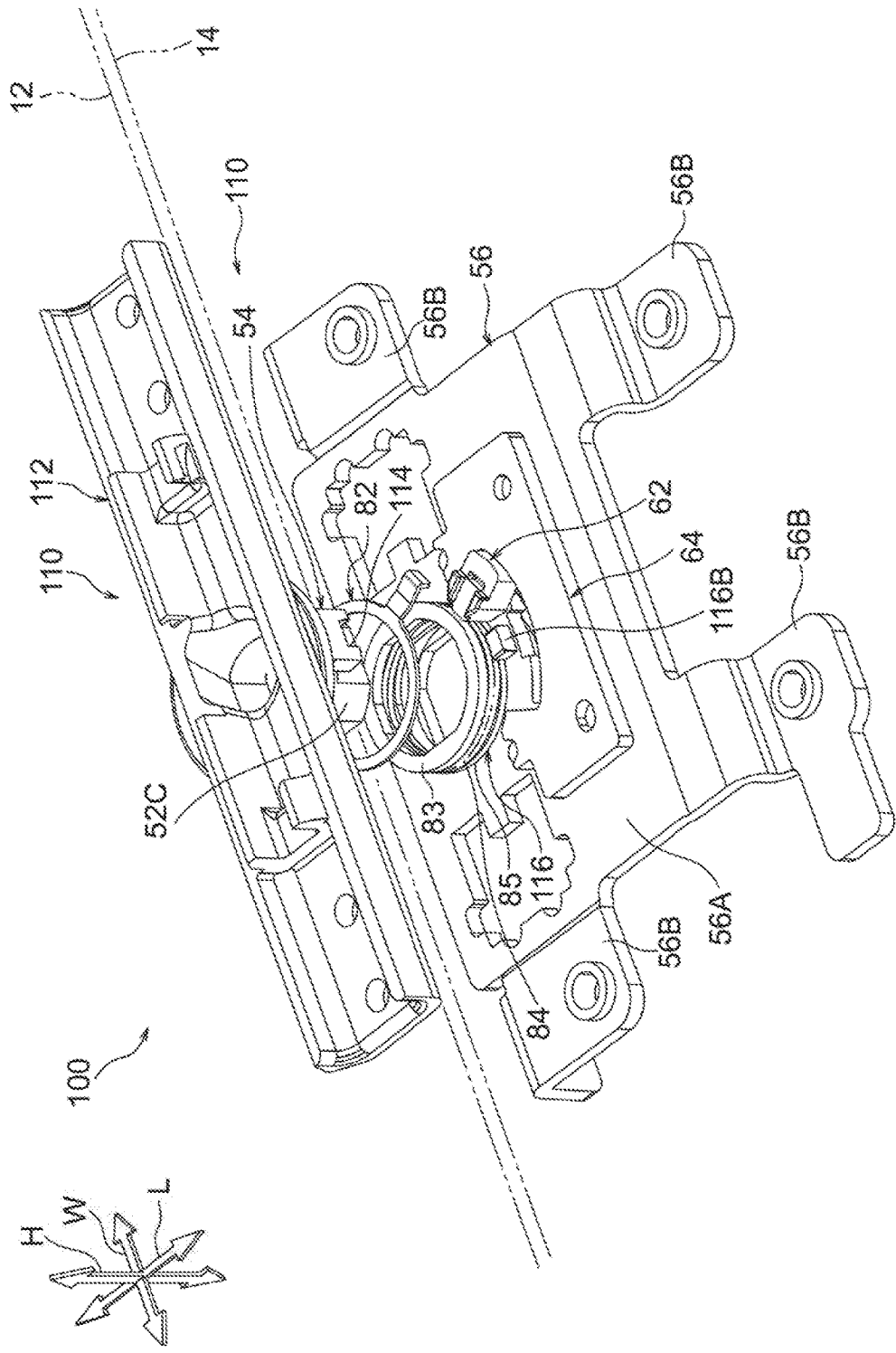
FIG. 18 is an exploded view of part of the hinge unit of the second exemplary embodiment.

Configuration of a notebook personal computer 100 serving as an example of an electronic device according to the second exemplary embodiment as illustrated in FIG. 17 and FIG. 18 is changed in the following respects with respect to the personal computer 10 (see FIG. 1) according to the first exemplary embodiment described above. Note that in the second exemplary embodiment, similar configuration to the above-described first exemplary embodiment employs the same reference numerals to those in the first exemplary embodiment, and explanation thereof is omitted.

As illustrated in FIG. 17 and FIG. 18, the personal computer 100 of the second exemplary embodiment is provided with a hinge unit 110 instead, of the hinge unit 50 (see FIG. 5) of the first exemplary embodiment. Note that springs 92 (see FIG. 5) are omitted in FIG. 17 and FIG. 18. Other configuration of the personal computer 100 excluding the hinge unit 110 is similar to other configuration of the personal computer 10 (see FIG. 1), excluding the hinge unit 50. Explanation thereby follows regarding the hinge unit 110.

Hinge Unit

As illustrated in FIG. 18, the hinge unit 110 includes a coupling member 112 that couples the display casing 12 and the main body casing 14 together (see FIG. 1), the base 36 that supports the coupling member 112, the cam member 62, and the restricting plate 64.

Figure 19:
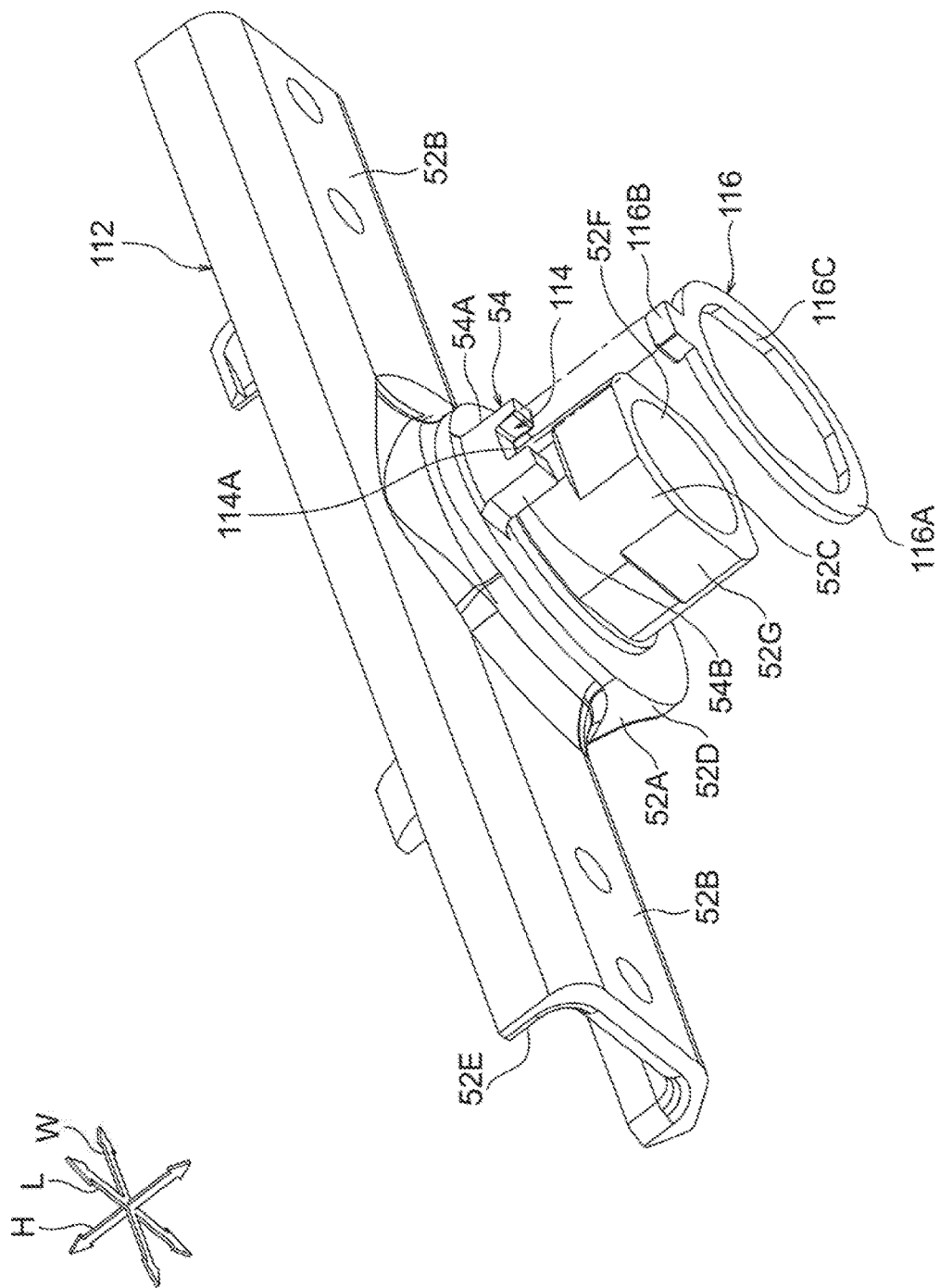
FIG. 19 is a perspective view of a coupling member and a supplementary washer of the second exemplary embodiment.
Figure 20:
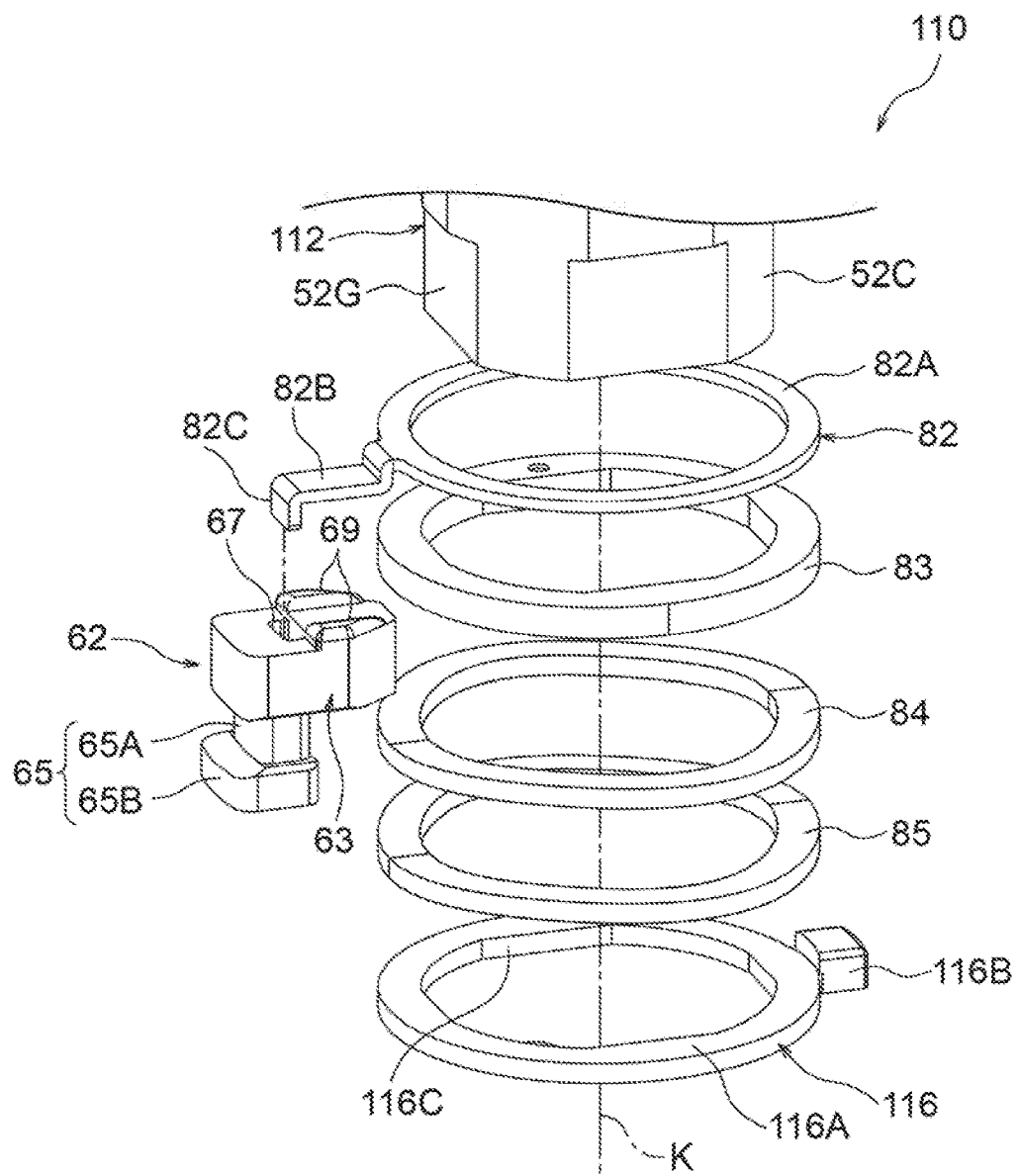
FIG. 20 is an exploded view of part of a hinge of the second exemplary embodiment.

As illustrated in FIG. 20, the hinge unit 110 also includes the free washer 82, the adjustment washer 83, the disc spring 84 and disc spring 85, and a supplementary washer 116 serving as an example of a first washer. The supplementary washer 116, the disc spring 85, the disc spring 84, the adjustment washer 83, and the free washer 82 are superimposed on each other in the above sequence from the lower side toward the upper side in the H direction, and portions thereof are provided (inserted) between the protruding portion 54 (see FIG. 19) and the shaft portion 52C.

Coupling Member

As illustrated in FIG. 19, the coupling member 112 includes the main body portion 52A, the extension portions 52B, the shaft portion 52C, and the outer peripheral portion 52D. The protruding portion 54 is provided projecting out from the coupling member 112. A recessed portion 114 is formed at an H direction lower end portion of the protruding portion 54. Namely, the coupling member 112 has a shape in which the recessed portion 114 is formed at the protruding portion 54 in the coupling member 52 (see FIG. 9) of the first exemplary embodiment.

Recessed Portion

As illustrated in FIG. 19, the recessed portion 114 is open in the axial direction (H direction) of the shaft portion 82C. The recessed portion 114 is formed in a U-shape open toward the H direction lower side as viewed in the L direction. An inner wall 114A of the recessed portion 114 engages (makes contact) with an engagement portion 116B, described below.

Washer

As illustrated in FIG. 20, the supplementary washer 116 includes a ring shaped portion 116A forming a main body, the engagement portion 116B projecting out in the radial direction of the ring shaped portion 116A from the ring shaped portion 116A, and a fitting hole 116C piercing through the ring shaped portion 116A along the second axial line K. As an example, the engagement portion 116B is formed with a rectangular shaped body, and the height of an upper face of the engagement portion 116B is higher than the height of an upper face of the ring shaped portion 116A. The engagement portion 116B is of a size that engages with the recessed portion 114.

Figure 21:
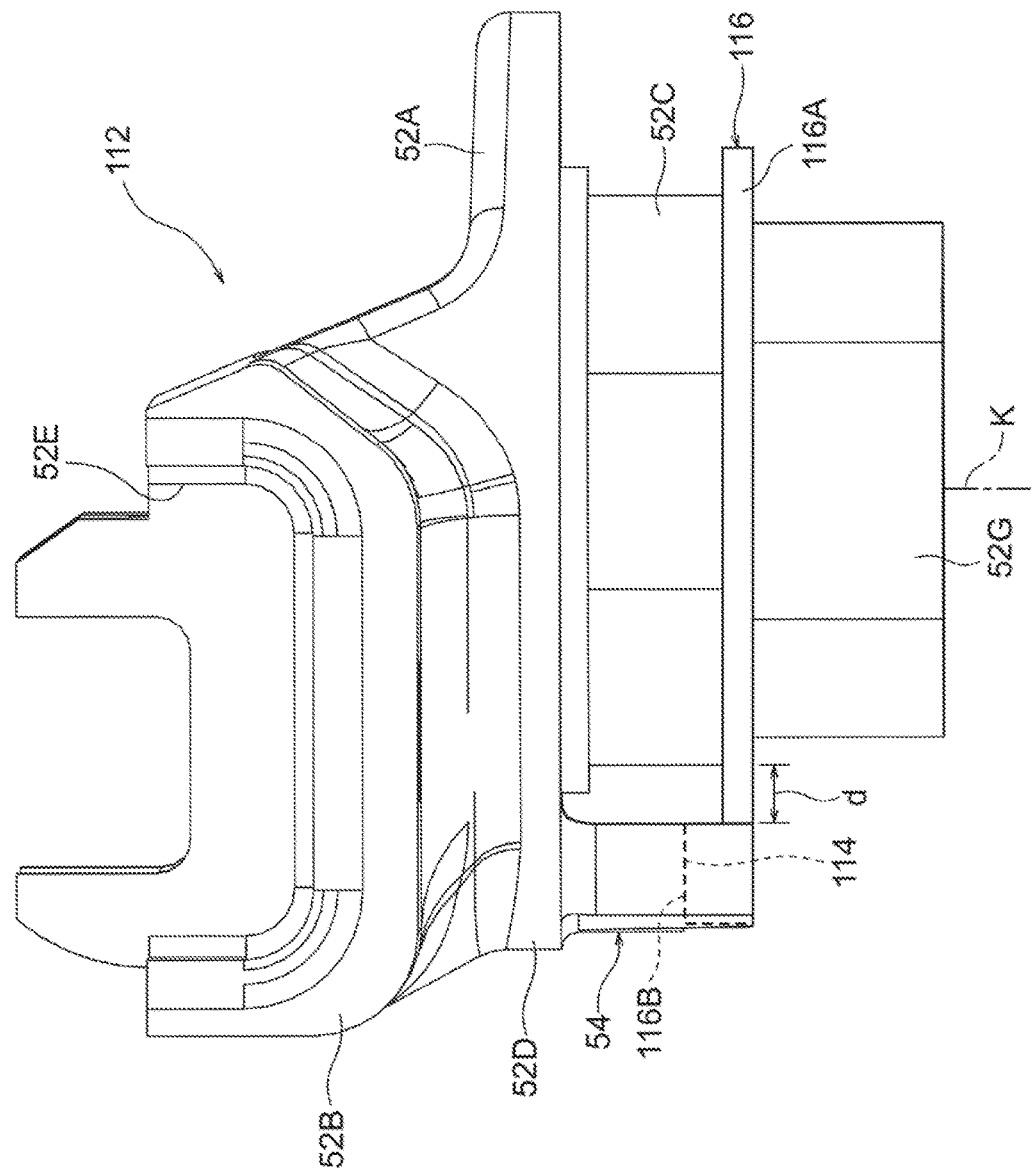
FIG. 21 is a side view of a coupling member of the second exemplary embodiment.

Note that in the supplementary washer 116, as illustrated in FIG. 19, the shaft portion 52C is fitted into the fitting hole 116C, and the engagement portion 116B engages with the recessed portion 114. Thus, as illustrated in FIG. 21, the supplementary washer 116 is disposed at substantially the center of the shaft portion 52C in the H direction. Note that the free washer 82, the adjustment washer 83, the disc spring 84, and the disc spring 85 (see FIG. 20) are omitted from illustration in FIG. 21.

Explanation follows regarding operation of the second exemplary embodiment.

Hinge Unit Assembly

Figure 22:
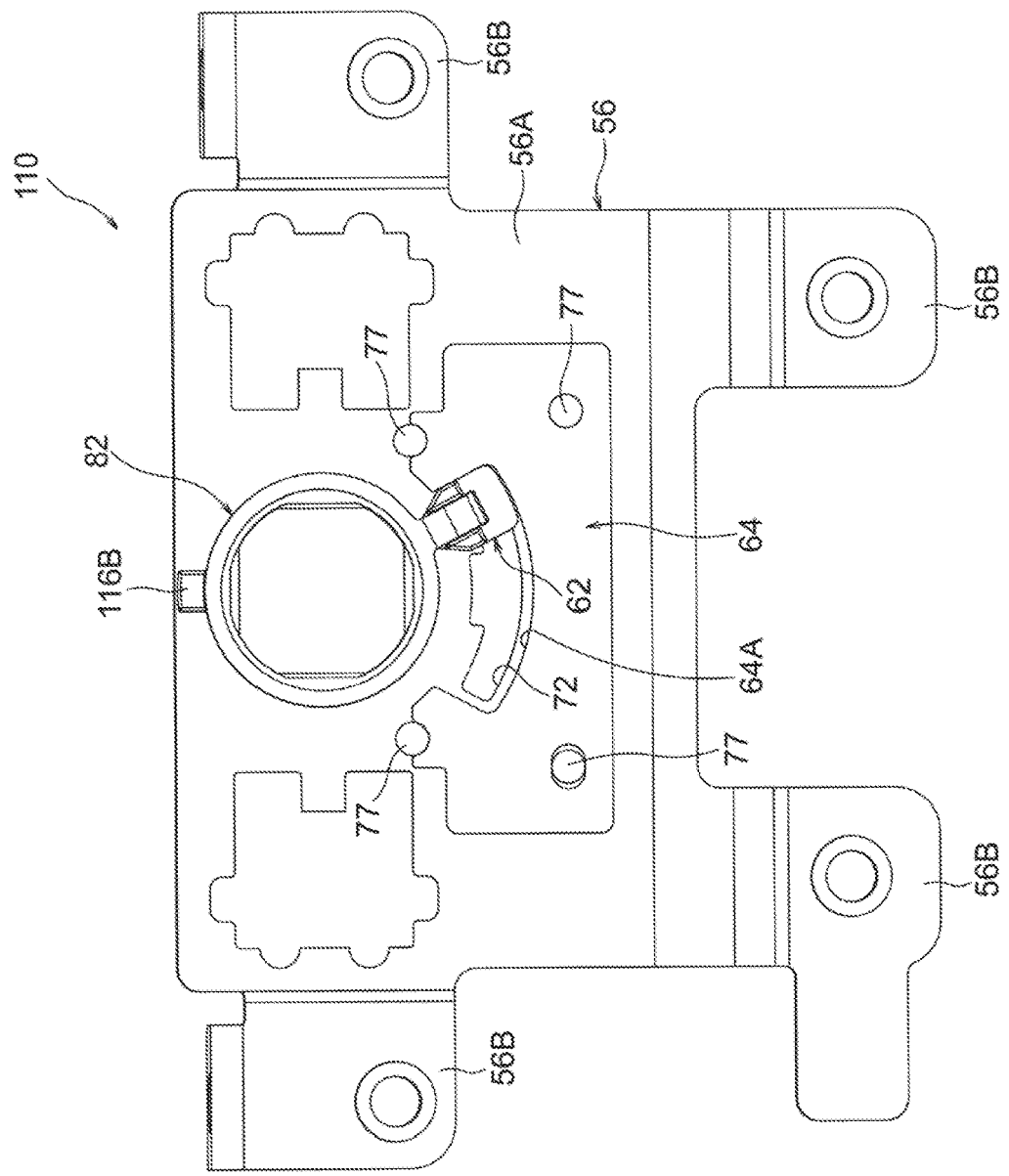
FIG. 22 is a plan view of part of the hinge unit of the second exemplary embodiment.

As illustrated in FIG. 22, the restricting plate 64 is fastened to the plate shaped portion 56A of the has 56, and the cam member 62 is provided at the plate shaped portion 56A. Next, as illustrated in FIG. 20, the shaft portion 52C is inserted into the free washer 82, the adjustment washer 83, the disc spring 84, the disc spring 85, and the supplementary washer 116 that are in a superimposed state. As illustrated in FIG. 19, the engagement portion 116B of the supplementary washer 116 engages with the recessed portion 114 when this is performed.

Next, when the shaft portion 52C is fitted into the fixed washer 61 (see FIG. 10) after the shaft portion 52C has been inserted into the shaft hole 57 (see FIG. 10), as illustrated in FIG. 17, the coupling member 112 is rotatably supported by the base 56. Next, the claw 82C of the free washer 82 is anchored in the anchor hole 67 of the cam member 62. The cam member 62 and the free washer 82 thereby form an integral unit that is moved in the circumferential direction independently of the shaft portion 52C. The hinge unit 110 is formed in this manner.

Hinge Unit Operation

Figure 23:
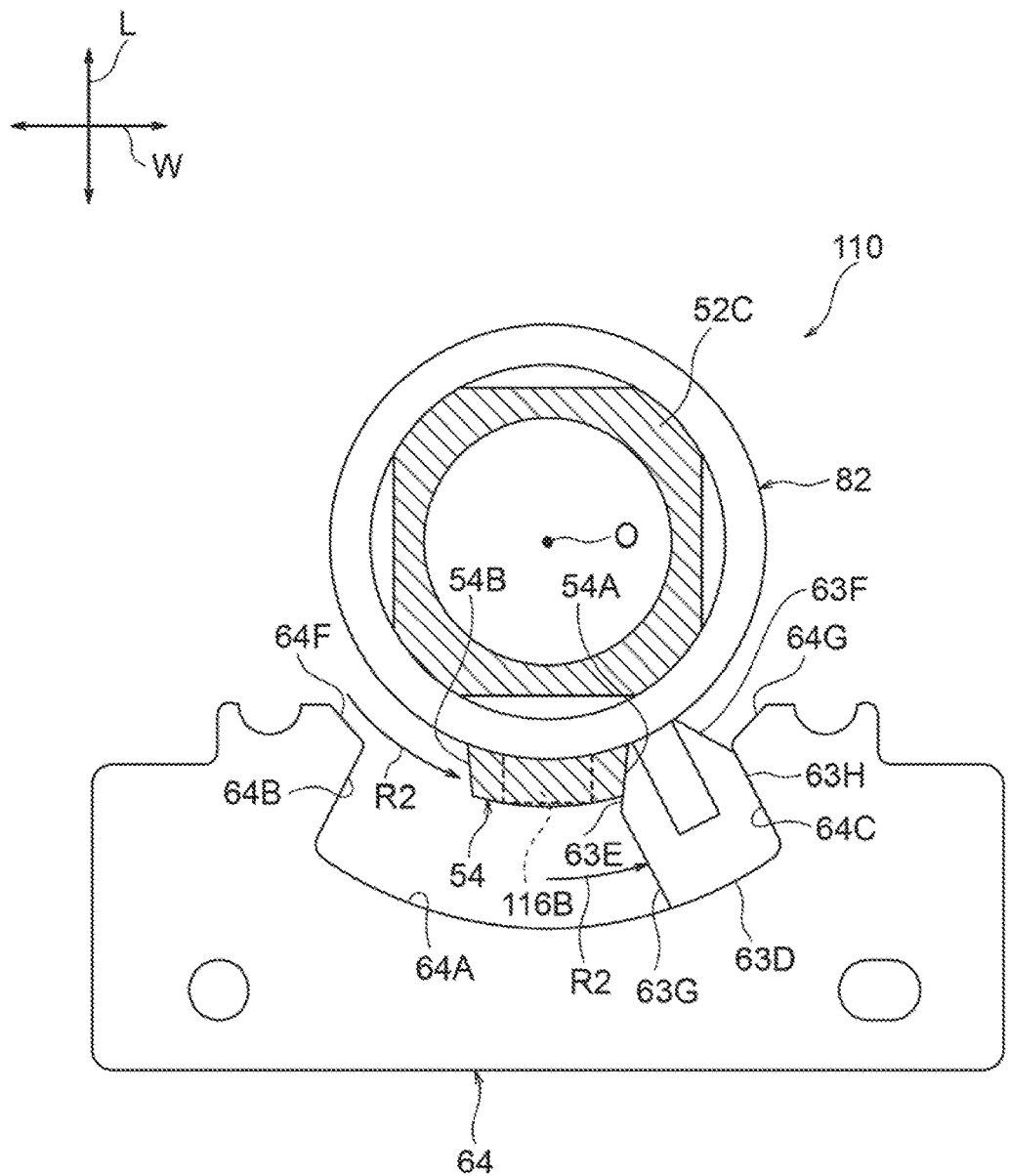
FIG. 23 is a schematic view illustrating a state in which a rotation shaft and a cam member of the second exemplary embodiment have been moved to the other side.

In the personal computer 100 illustrated in FIG. 17, a state in which the protruding portion 54 is positioned at the opposite side to the restricting plate 64 is referred to as an initial state. In the initial state, in a case in which the display casing 12 is rotated by 180° in the arrow R2 direction about the second axial line K, for example, as illustrated in FIG. 23, the shaft portion 52C is rotated in the arrow R2 direction about the rotation center O. The supplementary washer 116 (see FIG. 20) rotates integrally with the shaft portion 52C. Note that rotation of the shaft portion 32C in the arrow R1 direction is similar to that of the hinge unit 50 of the first exemplary embodiment illustrated in FIG. 15A and FIG. 16A. Explanation thereby follows regarding rotation of the shaft portion 52C in the arrow R2 direction, and explanation regarding rotation in the arrow R1 direction is omitted.

Next, as illustrated in FIG. 23, after the protruding portion 54 has passed between the adjustment washer 83 and so on (see FIG. 20) and the side wall 64F, the contact face 54A of the protruding portion 54 makes contact with the sloped face 63E of the cam member 62. Thus, the cam member 62 is pressed in the arrow R2 direction, and moves along the guide wall 64A until the right side face 63H makes contact with the terminal wall 64C. The cam member 62 is then restricted from moving and the protruding portion 54 stops moving due to the right side face 63H making contact with the terminal wall 64C. Rotation of the display casing 12 (see FIG. 17) by 180° in the arrow R2 direction is thereby complete.

Figure 24:
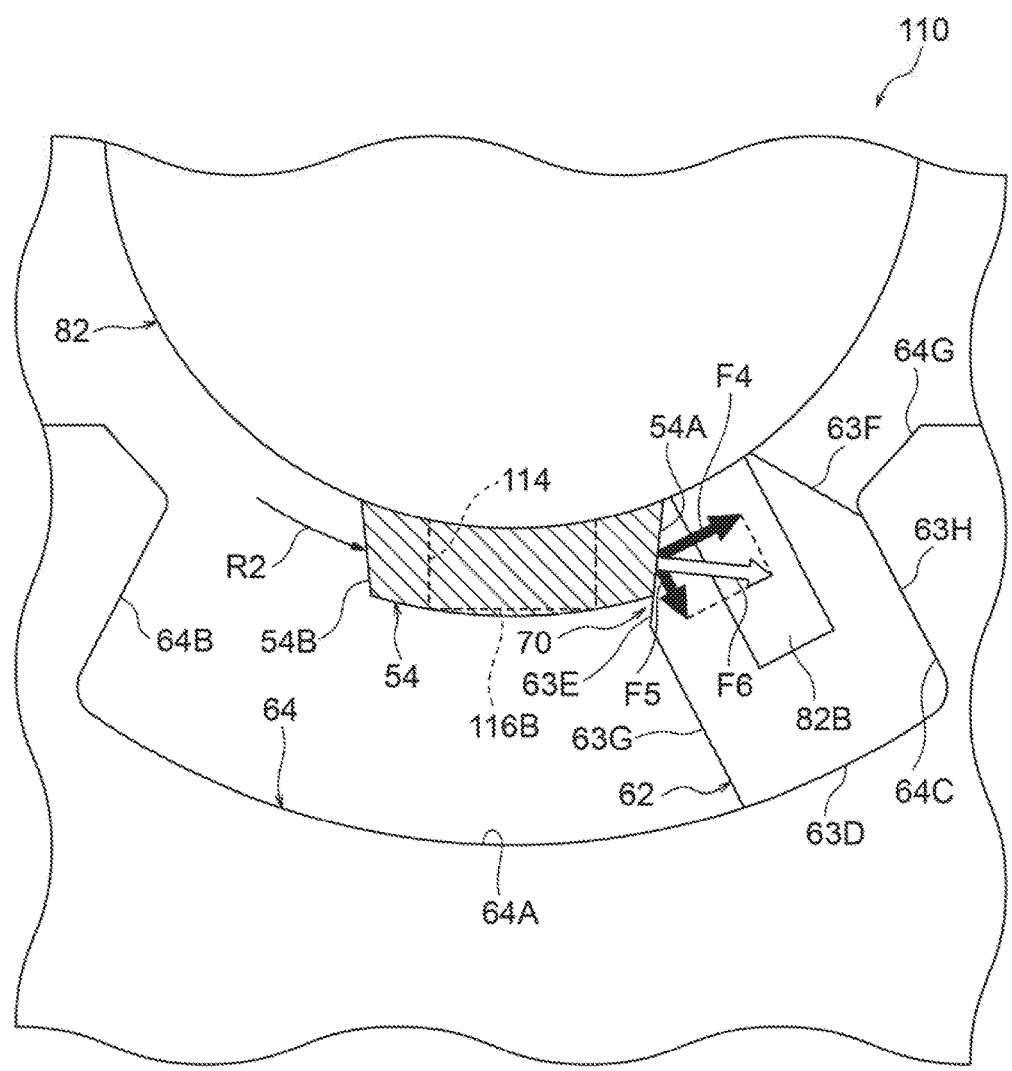
FIG. 24 is a schematic view illustrating force acting on a cam member from as protruding portion of the rotation shaft of the second exemplary embodiment.

Note that, as illustrated in FIG. 24, in a case in which the contact face 54A of the protruding portion 54 has made contact with the sloped face 63E of the cam member 62, the force F4 in a circular tangential direction about the rotation center O (sec FIG. 13) and the force F5 toward the outside in the radial direction act on the cam member 62. Namely, the force F6, this being the combined force of the force F4 and the force F5, acts on the cam member 62.

The three F6 acts in a compression direction that compresses the cam member 62, and acts on the restricting plate 64 through the terminal wall 64C. The restricting plate 64 resists the force F6. Thus, the force F6 (load) acting on the contact portion 70 between the protruding portion 54 and the cam member 82 acts on the cam member 62 further toward the outside than a movement trajectory (not illustrated in the drawings) of the protruding portion 54. This enables load to be suppressed from acting on the shaft portion 52C (see FIG. 20) in the personal computer 100 (see FIG. 18) and the hinge unit 110.

In the personal computer 100, load is suppressed from acting on the shaft portion 52C (see FIG. 20), thereby enabling the shaft portion 52C to be made smaller in diameter, and the hinge unit 110 to be made smaller in size.

In the personal computer 100, as illustrated in FIG. 21, the recessed portion 114 of the protruding portion 54 and the engagement portion 116B of the supplementary washer 116 engage with each other, such that an H direction lower portion of the protruding portion 54 is supported by the supplementary washer 116. Thus, the H direction lower end of the protruding portion 54 is not a free end, thereby enabling the protruding portion 54 to be suppressed from flexing in the radial direction and rotation direction of the shaft portion 52C.

In the personal computer 100, the recessed portion 114 is formed at the protruding portion 54, and the protruding portion 54 is suppressed from flexing by making the engagement portion 116B of the supplementary washer 116 engage with the recessed portion 114. The protruding portion 54 is accordingly suppressed from flexing by providing the supplementary washer 116, thereby enabling the protruding portion to be suppressed from flexing using a simple configuration.

Explanation follows regarding modified examples of the exemplary embodiments.

In the first and second exemplary embodiments, a notebook personal computer has been described as an example of an electronic device; however, another electronic device, such as a cellphone in which a main body casing and a display casing are superimposed on each other, may be employed.

Each of the coupling members 52, 112 may be configured only including the shaft portion 52C. The protruding portion 54 may be provided at the outer peripheral face of the shaft portion 52C.

The base 56 is not limited to a plate shape, and may be block shaped. In cases in which the hook portion 65 is not formed at the cam member 62, the through-hole 72 does not need to be formed.

The cam member 62 may be sandwiched between the guide wall 64A, and the adjustment washer 83, disc spring 84, disc spring 85, and adjustment washer 86. The cam member 62 may be sandwiched between the guide wall 64A, and the adjustment washer 83, disc spring 84, disc spring 85, and supplementary washer 116. Namely, the cam member 62 may either be in a contact state, or a non-contact state, with the adjustment washer 83, the disc spring 84, the disc spring 85, the adjustment washer 86, and the supplementary washer 116.

In cases in which the display casing 12 is only rotated in one direction and not rotated in the other direction, it is sufficient that the cam member 62 is formed with one of either the sloped face 63E or the sloped face 63F.

The cam member 62 and the free washer 82 are not limited to being made to move integrally by anchoring the claw 82C in the anchor hole 67, and may be made to move integrally by stowing the arm 82B in the groove 69, and making the groove 69 and the arm 82B come into contact with each other in a case in which the shaft portion 52C rotates.

In cases in which the display casing 12 only rotates in one direction out of the arrow R1 direction or the arrow R2 direction, it is sufficient that only one out of the sloped face 63E or the sloped face 63F is formed at the cam member 62.

The contact face 54A and the contact face 54B of the protruding portion 54 are not limited to being sloped faces, and may be curved faces protruding toward the outside.

The center angle θ of the circular arc of the through-hole 72 about the rotation center O may be a different angle to 60°. The center angle of the circular arc of the guide wall 64A about the rotation center O is not limited to being within the range from 60° to 90°, and may be within a different range.

Note that any of the modified examples out of the plural modified examples above that can be combined may be combined as appropriate.

Exemplary embodiments of the present disclosure have been explained above; however, the present disclosure is not limited to the above explanation, and obviously various other modifications may be implemented within a range not departing from the spirit thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device comprising:
   a coupling member that is provided at a first casing and that is formed with a rotation shaft provided with a protruding portion at an outer peripheral portion of the rotation shaft;
   a supporting member that is provided at a second casing and that is formed with a shaft hole into which the rotation shaft is inserted;

a movable member that is provided at a radial direction outside of the rotation shaft, that has a restricted movable range along a circumferential direction of the rotation shaft, and that makes contact with the protruding portion; and a sloped face that is formed at a contact portion of the movable member with the protruding portion, and that slopes from the rear side to the front side in a rotation direction, in a case in which the protruding portion makes contact with the movable member, as the sloped face approaches the outer peripheral portion of the rotation shaft.

2. The electronic device of claim 1, wherein:
a pair of the sloped faces are formed at the movable member; and
a distance along the circumferential direction between the pair of sloped faces widens on progression away from an outer peripheral face of the rotation shaft.

3. The electronic device of claim 1, wherein:
the supporting member includes a restricting member that includes a circular arc shaped guide wall that guides the movable member about the rotation shaft, and
a terminal wall that is formed at a terminal end of the guide wall and that restricts the movement of the movable member.

4. The electronic device of claim 3, wherein the movable member is a block body that is disposed and moves between the guide wall and the rotation shaft.

5. The electronic device of claim 1, wherein:
a through-hole is formed in the supporting member so as to pierce through in the axial direction of the rotation shaft further toward the outside than the shaft hole; and
a hook portion that hooks onto a hole wall of the through-hole is formed at the movable member.

6. The electronic device of claim 5, wherein:
the hook portion includes
an insertion portion that extends from a bottom face of the movable member toward the lower side and that is inserted into the through-hole, and
an extension portion that extends along the radial direction of the rotation shaft from a lower end of the insertion portion.

7. The electronic device of claim 1, wherein:
the electronic device is a notebook personal computer;
a display section that displays information is provided at the first casing; and
an input section that performs input is provided at the second casing.

8. An electronic device, comprising:
a coupling member that is provided at a first casing and that is formed with a rotation shaft provided with a protruding portion at an outer peripheral portion of the rotation shaft;
a supporting member that is provided at a second casing and that is formed with a shaft hole into which the rotation shaft is inserted;
a movable member that is provided at a radial direction outside of the rotation shaft, that has a restricted movable range along a circumferential direction of the rotation shaft, and that makes contact with the protruding portion;
a sloped face that is formed at a contact portion of the movable member with the protruding portion, and that is sloped toward the side nearest to the rotation shaft on progression from the rear side to the front side in a rotation direction in a case in which the protruding portion makes contact with the movable member; and a first washer that rotates integrally with the rotation shaft and is provided between the rotation shaft and the protruding portion provided projecting out from the coupling member.

9. The electronic device of claim 8, wherein:
a recessed portion open toward an axial direction of the rotation shaft is formed at the protruding portion; and
an engagement portion that engages with the recessed portion is formed at the first washer.

10. The electronic device of claim 8, wherein:
an anchor portion is formed at the movable member;
a second washer that rotates relative to the rotation shaft is superimposed on the first washer; and
an anchored portion that is anchored by the anchor portion is provided at the second washer.

11. The electronic device of claim 10, wherein the anchor portion is an anchor hole formed at an upper face of the movable member.

12. The electronic device of claim 11, wherein the anchored portion is a claw that is formed at a leading end of an arm extending from the second washer toward the outside in the radial direction, and that is anchored in the anchor hole.

13. The electronic device of claim 12, wherein a groove in which the arm is stowed is formed at the upper face of the movable member.

14. The electronic device of claim 10, wherein a biasing member that biases the second washer in the axial direction of the rotation shaft is provided between the rotation shaft and the protruding portion.

15. A hinge unit comprising:
a coupling member that is formed with a rotation shaft provided with a protruding portion at an outer peripheral portion of the rotation shaft;
a supporting member that is formed with a shaft hole into which the rotation shaft is inserted;
a movable member that is provided at a radial direction outside of the rotation shaft, that has a restricted movable range along a circumferential direction of the rotation shaft, and that makes contact with the protruding portion; and
a sloped face that is formed at a contact portion of the movable member with the protruding portion, and that sloped from the rear side to the front side in a rotation direction, in a case in which the protruding portion makes contact with the movable member, as the sloped face approaches the outer peripheral portion of the rotation shaft.

16. The hinge unit of claim 15, wherein:
a pair of the sloped faces are formed at the movable member; and
a distance along the circumferential direction between the pair of sloped faces widens on progression away from an outer peripheral face of the rotation shaft.

17. The hinge unit of claim 15, wherein:
the supporting member includes a restricting member that includes
a circular arc shaped guide wall that guides the movable member about the rotation shaft, and
a terminal wall that is formed at a terminal end of the guide wall and that restricts the movement of the movable member.

18. The hinge unit of claim 17, wherein the movable member is a block body that is disposed and moves between the guide wall and the rotation shaft.

19. A hinge unit, comprising:
a coupling member that is formed with a rotation shaft provided with a protruding portion at an outer peripheral portion of the rotation shaft;
a supporting member that is formed with a shaft hole into which the rotation shaft is inserted;
a movable member that is provided at a radial direction outside of the rotation shaft, that has a restricted movable range along a circumferential direction of the rotation shaft, and that makes contact with the protruding portion;
a sloped face that is formed at a contact portion of the movable member with the protruding portion, and that is sloped toward the side nearest to the rotation shaft on progression from the rear side to the front side in a rotation direction in a case in which the protruding portion makes contact with the movable member; and
a first washer that rotates integrally with the rotation shaft and is provided between the rotation shaft and the protruding portion provided projecting out from the coupling member.

20. The hinge unit of claim 19, wherein:
an anchor portion is formed at the movable member;
a second washer that rotates relative to the rotation shaft is superimposed on the first washer; and
an anchored portion that is anchored by the anchor portion is provided at the second washer.

* * * * *